United States Patent
Aerts

(10) Patent No.: US 10,264,403 B2
(45) Date of Patent: *Apr. 16, 2019

(54) FORMULATING PREDICTED LOCATIONS FOR A MOBILE DEVICE

(71) Applicant: Apple Inc., Cupertino, CA (US)

(72) Inventor: Tim A Aerts, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/939,134

(22) Filed: Mar. 28, 2018

(65) Prior Publication Data

US 2018/0317050 A1 Nov. 1, 2018

Related U.S. Application Data

(63) Continuation of application No. 15/275,291, filed on Sep. 23, 2016, now Pat. No. 9,955,312.

(51) Int. Cl.
*H04W 64/00* (2009.01)
*H04W 4/029* (2018.01)
(Continued)

(52) U.S. Cl.
CPC ............ *H04W 4/029* (2018.02); *G01C 21/00* (2013.01); *G01C 21/362* (2013.01);
(Continued)

(58) Field of Classification Search
CPC ..... H04W 12/08; H04W 64/00; H04W 4/021; H04W 4/028; H04L 45/02; H04L 45/64;
(Continued)

(56) References Cited

U.S. PATENT DOCUMENTS 8,104,048 B2 1/2012 Jalon et al.
9,200,920 B2 12/2015 Shin et al.
(Continued)

*Primary Examiner* — Phuoc H Doan
(74) *Attorney, Agent, or Firm* — Invoke

(57) ABSTRACT

Some embodiments of the invention provide a method for displaying a map. The method provides a first display area to display a map, and a second display area to overlap a portion of the first display area to display (i) a field to receive a search parameter and (ii) a set of predicted locations to view on the map. The second display area is moveable over the first display area in order to decrease its size to allow a larger portion of the map to be displayed in the first display area, or to increase its size to allow a larger number of predicted locations to be displayed in the second display area. In some embodiments, the second display area overlaps a bottom portion of the first display area. In some embodiments, the method is implemented by a map application that executes on a mobile device. The set of predicted locations displayed in the second display area in some embodiments include addresses harvested from applications executing on the mobile device. Examples of such applications include electronic mail applications, text messaging applications, the map application, ticket applications, restaurant reservation applications, social media applications, real estate applications, etc. The set of predicted locations includes in some embodiments addresses associated with previous destinations traveled to by the mobile device.

17 Claims, 19 Drawing Sheets

(51) Int. Cl.
*G06F 3/0488* (2013.01)
*G01C 21/00* (2006.01)
*G01C 21/36* (2006.01)

(52) U.S. Cl.
CPC ...... *G01C 21/3611* (2013.01); *G01C 21/3617* (2013.01); *G06F 3/04883* (2013.01); *H04W 64/00* (2013.01)

(58) Field of Classification Search
CPC . H04L 63/1408; H04L 63/10; H04L 67/2847; H04L 67/04; H04L 67/327
USPC ....... 370/252; 455/456.1; 715/838; 709/226, 709/224
See application file for complete search history.

(56) References Cited

U.S. PATENT DOCUMENTS

| | | |
|---|---|---|
| 9,207,093 B2 | 12/2015 | Barrett et al. |
| 9,303,997 B2 | 4/2016 | McGavran et al. |
| 2012/0023223 A1 | 1/2012 | Branch et al. |
| 2013/0113655 A1* | 5/2013 | Shen .................. H04W 4/029 342/357.31 |
| 2013/0151149 A1 | 6/2013 | Kristinsson et al. |
| 2014/0310655 A1 | 10/2014 | Sims |

* cited by examiner

*FIG. 11*

| | | | | |
|---|---|---|---|---|
| Home | <N> min to get home<br>Traffic is <description> via <Road name> | Share | Edit | |
| Work | <N> min to work<br>Traffic is <description> via <Road name> | Share | Edit | |
| Car | Parked Car<br><min> min ago, near <street> | Share | Edit | |
| Frequent Location | <N> min to <Address><br>Traffic is <description> via <Road name> | Share | Edit Name | Delete |
| Route Resume | Route to <Place name><br>Traffic is <description>, take <Road name> | Share | Delete | |
| Low Fuel | Nearby gas stations<br>Low fuel alert | Share | Delete | |
| App Donation | <Place name or Address><br>Recently viewed in <App name> | Share | Delete | |
| Recent Place | <Place name><br><Address> | Share | Delete | |
| Recent Place | Marked location<br><Address> | Share | Delete | |
| Recent Route | <Place name><br>from <Place name or Address> | Share | Delete | |
| Recent Search | <Query><br><City>, <State, Country> | Delete | | |
| Calendar Event | <Event name><br><Time>, <Place name or Address> | Share | Edit | |
| Reservation App | Reservation at <Name><br><Time>, table for <N> | Share | Edit | |
| Queue Managing App | Queued at <Restaurant name><br>Ticket <Number> | Share | Edit | |
| Ride Sharing App | <Ride name> arrives in <N> min<br>Pickup at <Address> | Share | Edit | |

*FIG. 12*

FORMULATING PREDICTED LOCATIONS FOR A MOBILE DEVICE

BACKGROUND

With proliferation of mobile devices (such as smartphones), numerous mobile-device applications have been developed to assist users with many of their daily activities. Map and navigation applications are one type of such applications. However, many of the applications today do not have optimal controls for one handed operations by their users. This is especially the case for applications that execute on smartphones with larger screen sizes.

SUMMARY

Some embodiments of the invention provide a map application with a novel search window. In some embodiments, the map application executes on a mobile device (e.g., a handheld smartphone) with a touch sensitive screen. The map application in some embodiments has (1) a map display area to display a map, and (2) a search window that proactively starts when the map application starts to overlap a portion of the map display area and to display a list of predicted locations to view on the map. In some embodiments, the map application's output is displayed on the display screen of the mobile device, while in other embodiments, its output is displayed on a display screen driven by the mobile device (e.g., a screen of a vehicle information system).

When the search window proactively opens, it displays in some embodiments a list of at least two predicted locations. The list of predicted locations in some embodiments includes one or more predicted destinations for the mobile device on which the map application executes. In some embodiments, the search window also includes a field to receive a search parameter. When a search parameter is entered in this field, the search window replaces the list of predicted locations with a list of locations that satisfy the search parameter, and the map display area displays one or more identifiers for one or more of the search-result locations on the map.

In some embodiments, the search window can slide over the map display area to increase its size to show a larger number of predicted locations, or to decrease its size to allow a larger portion of the map to be displayed in the map display area. The search window appears as a card that slides over the map display area. In some embodiments, the search window can remain stationary on the display screen without user input in three displays states: a minimized state, an intermediate state and a maximized state. In some of these embodiments, this window's minimized state only displays its search field as it overlaps a small region of the map display area, while its intermediate sate is the state to which it proactively opens to display its search field and at least two predicted locations. In its maximized state, the search window overlaps a larger portion of the map display area to identify more predicted locations than it displays in its intermediate state.

In some embodiments, the user can scroll the search window's list of predicted locations or search results while the search window is in its intermediate state. In other embodiments, the user cannot scroll through this window's content while the window is in its intermediate state. To scroll through this content, the user has to expand the search window to its maximized state in these embodiments. Also, in some embodiments, the map application allows the search window to appear in a display state between the minimized and intermediate states, or between the intermediate and maximized states, but requires the user to hold the search window in such a state (e.g., by providing input to move it to such a state and maintaining input to hold it in this state). In other embodiments, the map application allows the search window to remain stationary in a state between minimized and intermediate states, or between the minimized and maximized states.

Also, in some embodiments, the search window has an off-screen state, in which the map application slides the search window off the display screen and maintains this window off screen until it has to re-appear. The map application in some embodiments provides simple controls to move the search window on and off screen. For instance, when the search window is in its minimized state, the map application in some embodiments moves it off-screen after selection of the map in the map display area (i.e., when the touch-sensitive screen of the display screen is touched at a location that displays the map), or after the search window is dragged off-screen through a touch drag operation. When the search window is in its intermediate state, the map application in some embodiments moves it off-screen after a tap operation (e.g., a single tap operation or a double tap operation) of the map in the map display area or after the search window is dragged off-screen through a touch drag operation. In some embodiments, the search card does not have an off-screen state, and thereby only has three display states: the minimized state, the intermediate state, and the maximized state.

In some embodiments, the search window slides over the map display area from the bottom side of the map display area. In some embodiments, the bottom side is expected to be closer to a position for resting the mobile device in a hand of a user than a top side of the first display area. Accordingly, in some embodiments, the search window slides up from the bottom side of the map display area so that information and/or controls that are provided in this display area are more accessible for one handed operations (e.g., thumb-based touch operations) of the user as the user holds and interacts with the device with one hand. Also, in some embodiments, the height of the search window in its intermediate state is selected so that the user not only can interact with this window's controls easily with the thumb of the hand that holds the device, but can easily reach over this window to reach the map displayed in the map display area.

In some embodiments, the list of predicted locations displayed in the search window include (1) addresses obtained from applications executing on the mobile device, (2) addresses previously entered in this window's search field, (3) locations previously examined on the map in the map display area, and (4) locations previously traveled to by the mobile device (e.g., locations identified by an operating system framework of the mobile device as frequent locations traveled to by the device. Examples of applications from which addresses are obtained in some embodiments include electronic mail applications, text messaging applications, ticket applications, calendar application, restaurant reservation applications, social media applications, real estate applications, etc. As further described below, a prediction engine of the mobile device examines these addresses to formulate a list of predicted locations for the search window in some embodiments.

In some embodiments, the predicted locations include locations obtained from other devices associated with the mobile (e.g., other devices of the user or belonging to the same account). A cloud synchronizing services in some embodiments synchronizes locations identified on a set of two or more related devices. By showing locations identified on other devices in the search window, the map application of some embodiments allows the user to not only view suggested locations that have been locally identified by the mobile device based on user interaction and/or communications, but also view suggested locations that have been remotely identified by other device's of the user based on the user's interaction and/or communications on these other devices.

The search window in some embodiments displays a set of metadata for each predicted location that it displays. One example of such metadata is a source identifier that specifies a source from which the predicted location was obtained. Other examples of metadata displayed for predicted locations include travel time to the predicted location, the road to take to the predicted location, traffic congestion on a route to the predicted location, status of a transit line to use to reach the predicted location, a time for a reservation at the predicted location, a position in a reservation queue for a reservation at the predicted location, a time of an associated event at the predicted location, etc.

In some embodiments, the map application supports map browsing or navigation for multiple transportation modes, such as driving, walking, transit, ride sharing, etc. The search window in some of these embodiments provides different sets of metadata for a predicted location for different transportation modes of the map application (e.g., transit travel metadata for a location when the map is being viewed in a transit mode or the application has a transit mode preference setting, and driving travel metadata for the same location when the map is being viewing in a driving mode or the application has a driving mode preference setting).

The search window in some embodiments removes a predicted location from its list of predicted locations when this location is no longer relevant. For instance, in some embodiments, the map application does not present a predicted location in the search window when it detects that its mobile device has reached the predicted location. Also, when the predicted location has an associated time (e.g., the location is a location of a calendared event), and this time has passed, the map application does not include the predicted location in the second display area.

In some embodiments, the search window also provides a set of controls for performing one or more operations with respect to predicted locations that it lists. Examples of such controls include a sharing control for sharing a predicted location with others, an edit control for editing one or more displayed parameters for a location (e.g., for editing the name, or address of a location), a delete control for deleting a predicted location from the search window. A user can access these controls for a location by performing a swipe gesture on the location's displayed record to cause the location's record to slide over to reveal one or more of these controls, which can then be selected.

In some embodiments, a prediction engine executes on the mobile device (1) to analyze candidate locations from various sources on the mobile device, such as those described above, and (2) to identify a sorted list of predicted location based on this analysis. The prediction engine in some embodiments includes (1) a filter for eliminating irrelevant or uninteresting addresses, (2) a de-duplicator for eliminating duplicate records collected from different sources for the same location, (3) a data augmenter for improving the data for the locations that are not filtered out by the filter or de-duplicator, and (4) a sorter for organizing the predicted locations in a particular sorted order. The prediction engine also includes a tracker in some embodiments that correlates the location of the mobile device and one or more of the predicted locations, and for these locations, generates travel data for display with each of these predicted locations, as further described below.

In some embodiments, the prediction engine has multiple clients on the mobile device for its analysis. One of these clients is the proactive search window of the map application. Other clients on the mobile device include (1) a predicted travel display area that is accessible on the mobile device without opening the map application (e.g., is a display pane accessible off the home page of the mobile device), (2) a display pane that is opened for the map application in response to a force touch input with respect to the map application, (3) a display area on a watch paired with the mobile device, and (4) a display area on a vehicle information display system being driven by the map application. The prediction engine has a prediction limiter for each of its different clients, and each client's limiter discards all but N predicted locations for that client, where N is an integer that is custom selected for that client. For each of its client, the prediction engine also has a sorter for reordering the predicted locations generated for the client based on heuristics that are specified for the client.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary. Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

FIG. 11 illustrates one example of such a swipe gesture in two operational stages.

FIG. 12 illustrates different sets of actions that are available for different location records in the search card of the map application of some embodiments.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a map application with a novel search window. The map application in some embodiments has (1) a map display area to display a map, and (2) a search window that proactively opens when the map application starts to overlap a portion of the map display area and to display a list of predicted locations to view on the map. When the search window proactively opens, it displays in some embodiments a list of at least two predicted locations. In some embodiments, the search window also includes a field to receive a search parameter. When a search parameter is entered in this field, the search window replaces the list of predicted locations with a list of locations that satisfy the search parameter, and the map display area displays one or more identifiers for one or more of the search-result locations on the map.

In some embodiments, the search window can slide over the map display area to increase its size to show a larger number of predicted locations, or to decrease its size to allow a larger portion of the map to be displayed in the map display area. In some embodiments, the search window can remain stationary on the display screen without user input in three displays states: a minimized state, an intermediate state and a maximized state. In some of these embodiments, this window's minimized state only displays its search field as it overlaps a small region of the map display area, while its intermediate sate is the state to which it proactively opens to display its search field and at least two predicted locations. In its maximized state, the search window overlaps a larger portion of the map display area to identify more predicted locations than it displays in its intermediate state.

FIGS. 1-4 illustrate an example of a map application of some embodiments of the invention. This application executes on a mobile device 100 with a touch-sensitive display screen. In this example and several other example illustrated in other figures, the mobile device is a smartphone and the output of the map application is displayed on the mobile device's display screen. In other embodiments, the map application executes on another device (e.g., on another type of mobile device (such as a tablet), on a desktop or laptop, etc.) and/or drives the display screen of another device (e.g., of a vehicle information system). Also, in the examples illustrated in FIGS. 1-4 and several other figures, the search window is displayed as a search card In other embodiments, the search window has a different appearance than a card.

Figure 1:
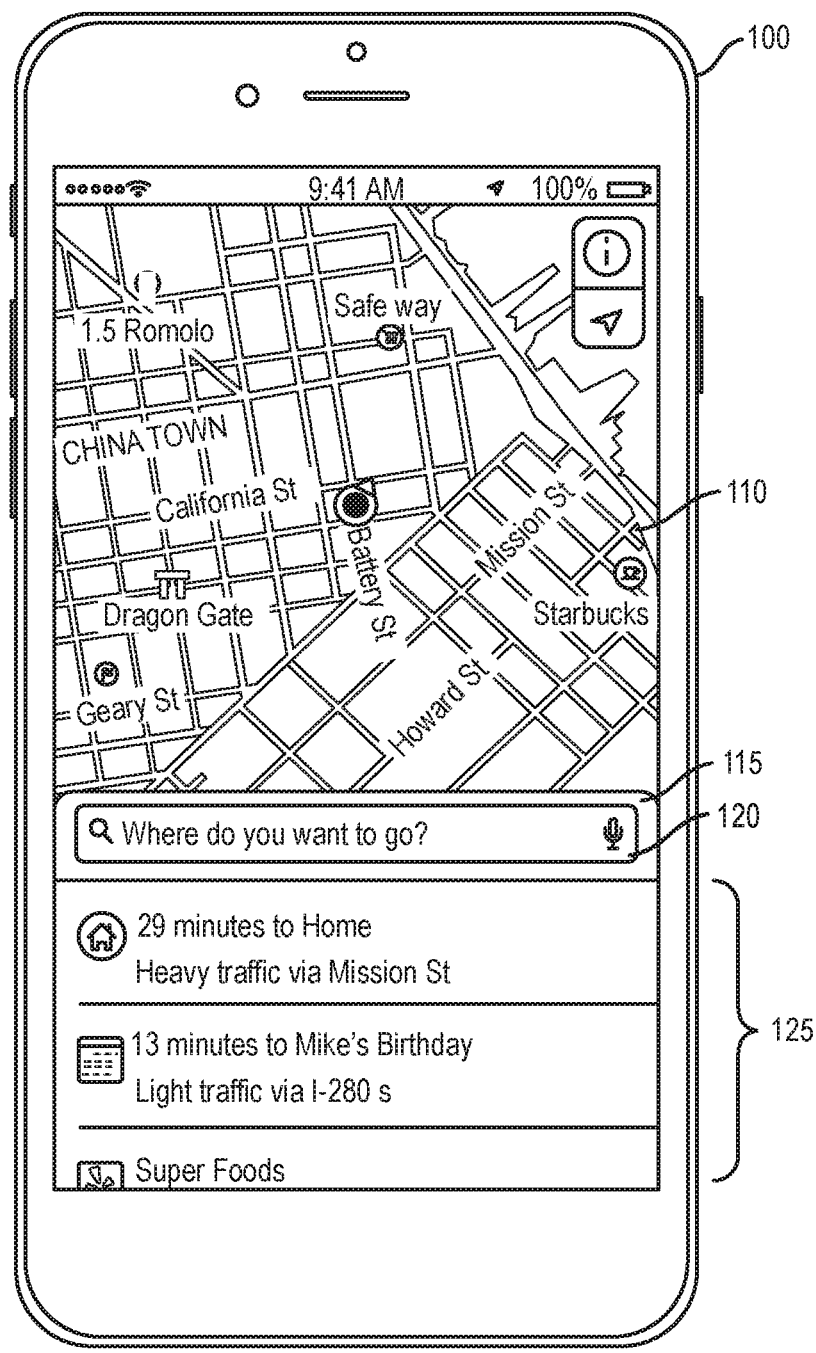
FIG. 1 illustrates the map application displaying (1) a map display area that displays a map of a region, and (2) a search card that proactively opens to overlap a bottom portion of the map display area when the map application starts in order to display a list of at least two predicted locations to view on the map.

FIG. 1 illustrates the map application displaying (1) a map display area 110 that displays a map of a region, and (2) a search card 115 that proactively opens to overlap a bottom portion of the map display area when the map application starts in order to display a list of at least two predicted locations to view on the map. The partially opened search card is intended to proactively display some suggested locations for viewing and easy selection by the user. However, the map is also displayed in order to provide the user easy access to view a location on a map. The region that is initially displayed in the map display area 110 in some embodiments is determined based on heuristics that account for several factors, such as the last location displayed by the map application, the current location of the mobile device, and the distance between the mobile device and the location last presented by the map application. One such set of heuristics are described in U.S. patent application Ser. No. 13/842,405.

As shown, the search card 115 has a search field 120 to receive a search parameter, which can be expressed in terms of one or more strings of alphanumeric characters. The top of the search card has a handle 280 that serves as a visual clue that the top of the search card can be selected for dragging the search card up or down. The search card also includes a list area 125 for listing a set of locations and/or searches. When the search card is open and it does not have a search parameter, its list area 125 displays a list of predicted locations. In some embodiments, the list of predicted locations displayed in the search card's list area 125 include (1) addresses obtained from applications executing on the mobile device (e.g., addresses obtained from other applications' use of the map application's location services), (2) addresses previously entered in this card's search field, (3) locations (e.g., POIs) and routes previously examined on the map in the map display area, and (4) locations previously traveled to by the mobile device. As further described below, a prediction engine of the mobile device examines these addresses to formulate a list of predicted locations for the search card in some embodiments. The list of predicted locations in some embodiments includes one or more predicted destinations for the mobile device on which the map application executes.

Examples of applications from which addresses are obtained in some embodiments include electronic mail applications, text messaging applications, ticket applications, calendar application, restaurant reservation applications, social media applications, real estate applications, etc. These addresses are harvested by a framework address harvesting service of the operating system of the phone 100 in some embodiments. U.S. patent application Ser. No. 14/081,843 describes this service for some embodiments of the invention.

In some embodiments, the mobile device's operating system has a framework frequent-location service that identifies frequent locations to which the device travels. These locations include home and work addresses the device in some embodiments, as well as other locations to which the device frequently travels. Several techniques for identifying such frequent locations are described in U.S. patent application Ser. Nos. 14/081,895, 14/020,689 and 14/022,099, which are incorporated herein by reference.

In some embodiments, the predicted locations include locations obtained from other devices associated with the smartphone 100 (e.g., other devices of the user or belonging to the same account). A cloud synchronizing services in some embodiments synchronizes locations identified on a set of two or more related devices, and the prediction engine of the phone 100 analyzes the locations that are locally and remotely identified to formulate the list of predicted locations. By showing locations identified on other devices in the proactive search card of the smartphone 100, the map application of some embodiments allows the user to not only view suggested locations that have been locally identified by the smartphone based on user interaction and/or communications, but also view suggested locations that have been remotely identified by other device's of the user based on the user's interaction and/or communications on these other devices.

At any given time, this prediction engine analyzes all the candidate locations (e.g., the frequent locations, the harvested, obtained and donated addresses, the previous search queries, and recently viewed routes, POts, and addresses) in order to identify a sorted list of locations to display in the search card. To analyze these candidate locations, the prediction engine accounts for the current time and/or the current location of the mobile device in order to provide suggested searches and/or locations that are relevant to the current time and/or current location of the device. For instance, in some embodiments, the map application does not present a predicted location in the search card when it detects that its mobile device has reached the predicted location. Also, when the predicted location has an associated time (e.g., the location is a location of a calendared event), and this time has passed, the map application does not include the predicted location in the search card. Thus, the search card in some embodiments removes a predicted location from its list of predicted locations when this location is no longer relevant.

The search card in some embodiments displays a set of metadata for each predicted location that it displays. One example of such metadata is a source identifier that specifies a source from which the predicted location was obtained. Other examples of metadata displayed for predicted locations include travel time to the predicted location, the road to take to the predicted location, traffic congestion on a route to the predicted location, status of a transit line to use to reach the predicted location, a time for a reservation at the predicted location, a position in a reservation queue for a reservation at the predicted location, a time of an associated event at the predicted location, etc. Additional examples of such metadata will be further described below.

In some embodiments, the map application supports map browsing or navigation for multiple transportation modes, such as driving, walking, transit, ride sharing, etc. The search card in some of these embodiments provides different sets of metadata for a predicted location for different transportation modes of the map application (e.g., transit travel metadata for a location when the map is being viewed in a transit mode or the application has a transit mode preference setting, and driving travel metadata for the same location when the map is being viewing in a driving mode or the application has a driving mode preference setting).

In some embodiments, the search card can provide different sets of predicted locations for the same instance in time when the map application operates in different transportation modes. More specifically, the prediction engine of the phone 100 in some embodiments accounts for some or all of the transportation modes of the map application to formulate the list of predicted locations to display in the search card. For instance, while the map application operates in a first transportation mode, the map application displays a first set of predicted locations in the location list area 125 of the search card. The map application then receives input that causes it to switch to the second transportation mode. After this switch, the map application then displays, in the location list area 125, a second set of predicted locations that is different from the first set of predicted locations (e.g., the second set has at least one predicted location not in the first set, and/or the first set has at least one predicted location not in the second set)

In some embodiments, the search card 115 has four display states, which are a minimized state, an intermediate state, a maximized state, and an off-screen state. In other embodiments, the search card 115 does not have an off-screen state, and thereby only has three display states: the minimized state, the intermediate state, and the maximized state. In these embodiments, the map application displays the search card in one of its display states, or displays another card, at all times. Several examples illustrated in the figures and described below use all four display states. However, one of ordinary skill will realize that not all of these states (e.g. the off-screen state) are used by the search card of some embodiments of the invention.

Figure 2:
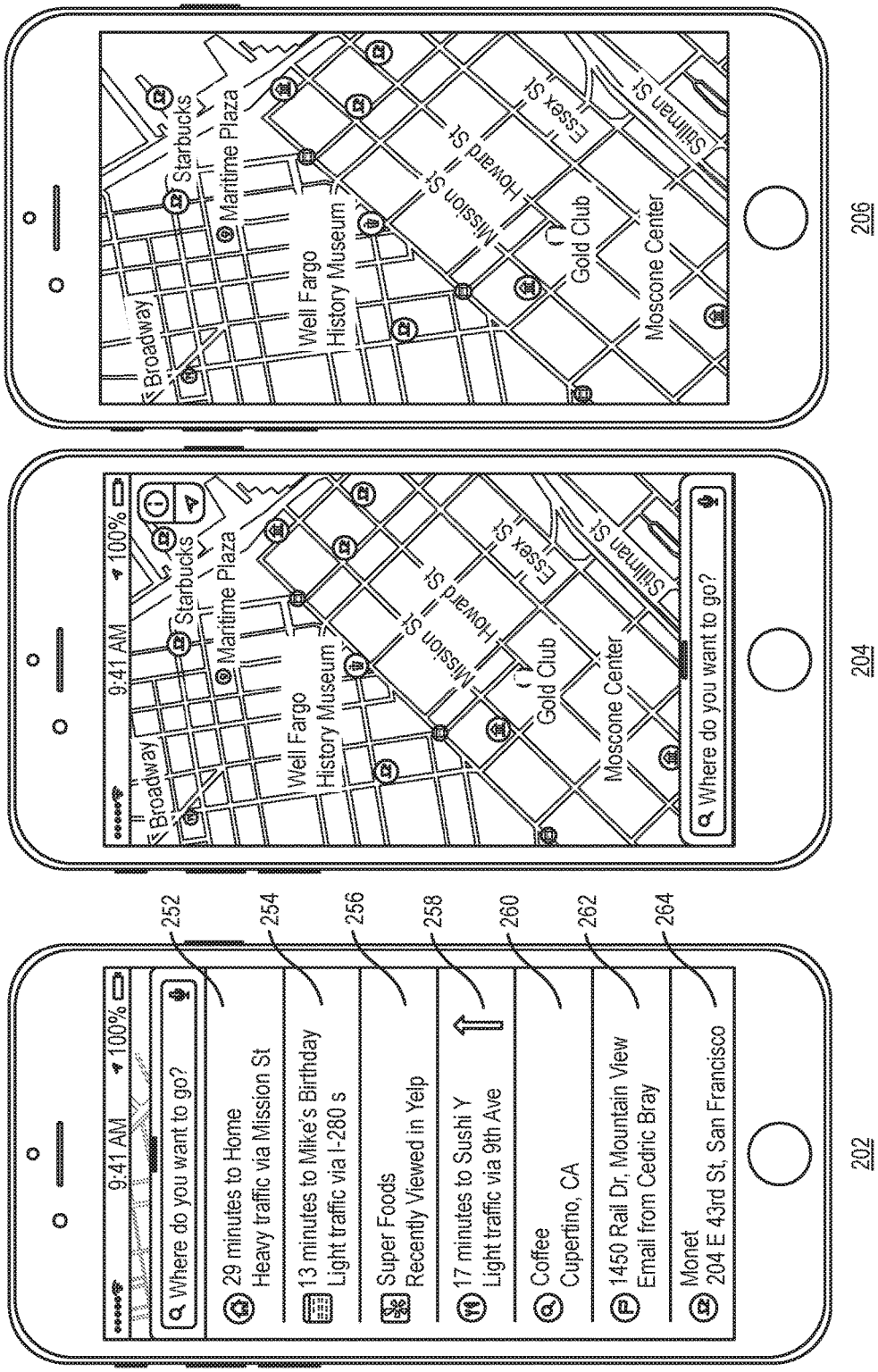
FIG. 2 illustrates three other operational stages of the map application that respectively illustrate the search card's maximized state, minimized state, and off-screen state.

FIGS. 1 and 2 illustrate four display states (the minimized state, the intermediate state, and the maximized state, and the off-screen state) of the search card of some embodiments. FIG. 1 illustrates the map application presenting the intermediate state of the search card on the display screen of the smartphone 100. FIG. 2 illustrates three other operational stages 202, 204 and 206 of the map application that respectively illustrate the search card's maximized state, minimized state, and off-screen state.

Figure 3:
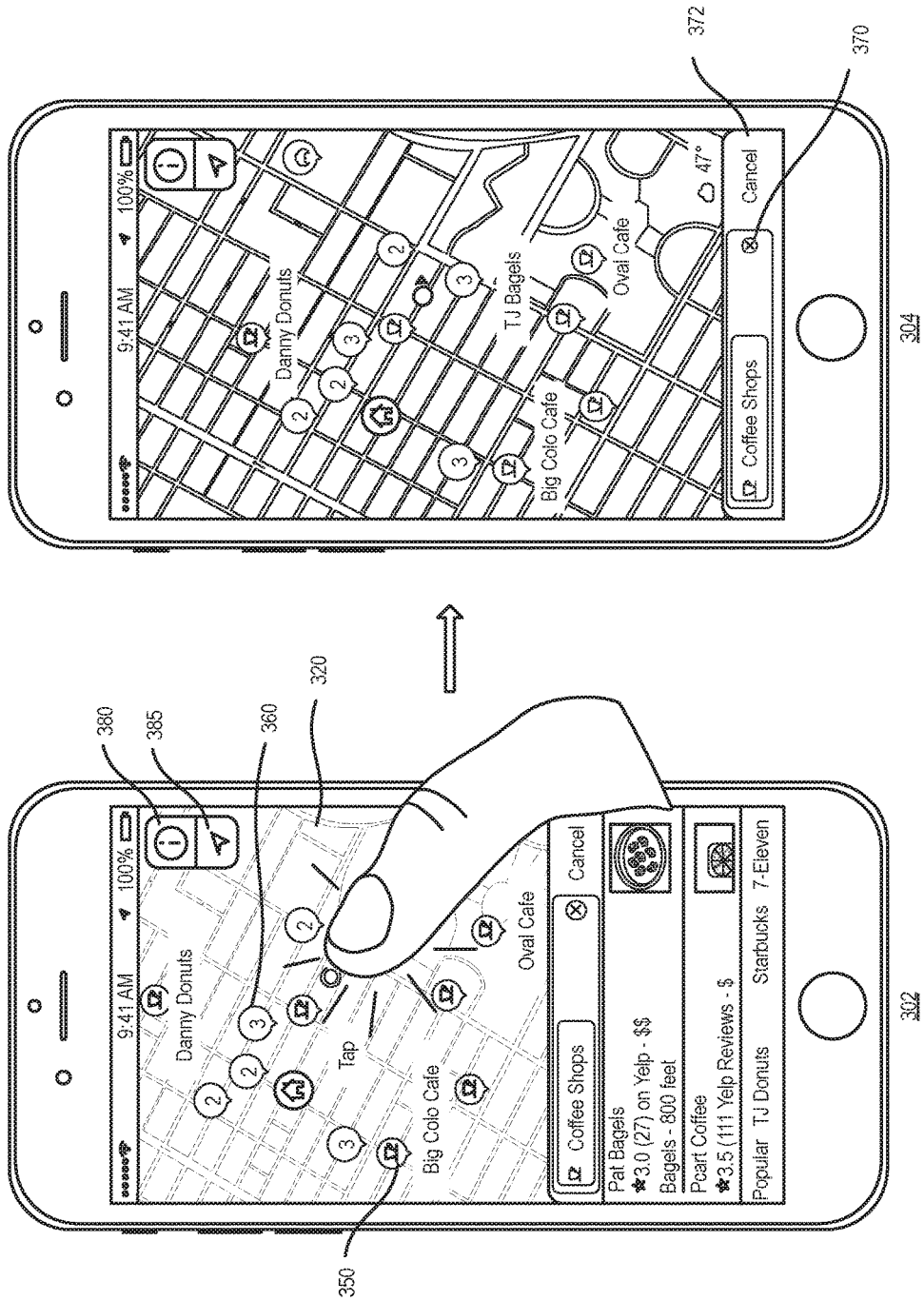
FIGS. 3-6 illustrate examples of several novel controls that the map application of some embodiments provides for transitioning between the four display states of the search card.

In its minimized state, the search card displays a small amount of information and/or controls. As shown in the second stage 204 of FIG. 2, the search card 115 in its minimized state overlaps a much smaller part of the map presented in the map display area 110 than the space covered by this card in the intermediates and maximized states shown in FIGS. 1 and 2. The search card 115 in its minimized state does not show its location list area 125 but does show its search field 120. When the search field has received a search parameter, the search card in its minimized state shows the search parameter in its search field 120, while the map displays the search results, as further described below. In the minimized, intermediate, and maximized states, the search card shows control 370 for removing the displayed search parameter from the search filed, and the control 372 for removing the search card to its off-screen state (i.e., to remove this card from overlapping any portion of the map display area 110), as illustrated in FIG. 3.

When the user wishes to interact with the search card in its minimized state, the user in some embodiments can select the card (e.g., tapping the card), which then opens to its intermediate state. In other embodiments, the selection of a minimized search card causes the card to open to its last non-minimized, non-off-screen state. When a search card in its minimized state displays one or more controls, the user selects the minimized card at a location that is not one of these controls in order to cause the card to transition from its minimized state to another state. Interactions with the card in its various states will be further described below.

In its intermediate state, the search card provides more information and/or controls than in its minimized state. Also, the presentation of the information in the search card's intermediate state provides a clue in some embodiments that the card has additional information and/or controls that are currently off screen. For example, in some embodiments, some of the information and/or controls that are displayed in the search card's intermediate display state are cut off at the card's bottom to imply that there is more information and/or controls off screen. FIG. 1 illustrates the third entry 155 in the list display area being partially cut off to provide a clue regarding additional entries in the search card's list display area 125.

Also, in some embodiments, the height of the search card in its intermediate state is selected so that the user can interact with this card's controls with the thumb of the hand that holds the device. More generally, the search card 115 slides up from the bottom of the map display area in some embodiments so that the user can easily interact with its entries and controls while this card is in its minimized, intermediate and maximized states. In some embodiments, the bottom side is expected to be closer to a position for resting the smartphone 100 in a hand of a user than a top side of the first display area. Thus, the search card 115 slides up from the bottom side of the device in order to make it easier for the easier to interact with this card with the thumb of the hand holding the phone.

When the phone is flipped upside down, the phone of some embodiments rotates the displayed output of all its applications, including the map application, upside down (including the map display area and all the search card), because it is expected that the top of the device will now reside in the palm of the user's hand. This rotation of the displayed outputs is a common feature of mobile devices sold by Apple Inc., and it is facilitated by the position sensors of these mobile devices. Examples of a user's one handed interaction with the search card will be further described below.

In some embodiments, the user can scroll the search card's list of locations while the card is in its intermediate state. In other embodiments, the user cannot scroll through the search card's list of locations while the card is in this state. To scroll through this content, the user has to expand the card to its maximized state in these embodiments. In its maximized state, the search card displays the most amount of information and/or controls that it can display, as shown by the first operational stage 202 of FIG. 2. The scrolling of the search card's list of locations will be further described below.

Once opened, the search card displays several additional suggested locations. In this example, the search card seven suggested locations when it is fully opened in the first stage 202, while displaying two and a half suggested locations/searches when it is partially opened in its intermediate stage that is shown in FIG. 1. In some embodiments, the search card 115 cannot completely overlap the map display area 110 even when search card 115 is at its maximized size, as shown in the first stage 202. Other embodiments allow the search card 115 to completely overlap the map display area 110.

The third stage 206 of FIG. 2 illustrates the map application output when the search card is in its off-screen state. In this state, no portion of the search card 115 is displayed on the screen, in order to maximize the amount of the map presented in the map display area. When the search off-screen state, the map application in some embodiments can present the search card (e.g., in its last displayed state or in its intermediate state) based on input from the user. For instance, the map application in some embodiments presents the search card in its last displayed on-screen state from its off-screen state when the user selects a location on the map in the map display area that is not a point of interest (POT) on the map.

To provide an unobstructed view of the map, the map application in some embodiments also removes other controls from the map display area when it moves the search card to its off-screen state. Example of such other controls are an information control 380 and a position identifier 385 that the map application displays in the top corner of the map display area when the search card is in its intermediate or minimized state but not in its off-screen state. The information control 380 allows the user to change certain aspects of the map presentation, e.g., to switch the map mode (e.g., driving mode, walking mode, transit mode, etc.), to display or hide the traffic conditions, to switch between 2D or 3D map presentation. The position identifier 385 directs the map application to show a region on the map that corresponds to the current location of the device, and to show the location of the device in that region. In some embodiments, the information control 380 and position identifier 385 provide other functionality that is currently provided by these controls in the current mobile device operating system.

Different embodiments provide different controls for transitioning between off-screen, minimized, intermediate and maximized display states of the search card 115. In some embodiments, the user can transition between these states by touching the top of the card, and dragging this top to a larger display state (if any) or down to a smaller display state. Also, the user in some embodiments can change the display state of the card by performing a "flick" operation, which entails touching the top of the card and performing a quick up or down drag operation. When the speed or acceleration of the flick operation (i.e., of its drag operation) exceeds a threshold value, this operation in some embodiments can direct the map application to skip the intermediate display state as the card shrinks from its maximized state to its minimized state, or expands from its minimized state to its maximized state. When the speed or acceleration of the flick operation does not exceed the threshold value, the flick operation in these embodiments direct the map application to stop at the intermediate display state when transitioning from the maximized or minimized state.

FIGS. 3-6 illustrate examples of several novel controls that the map application of some embodiments provides for transitioning between the four display states of the search card 115. FIG. 3 illustrates how the height of the search card in its intermediate state allows the user to easily direct the application to have this card transition to its minimize state. This figure shows two operational stages 302 and 304 of the map application.

In this example and the other examples (such as the example illustrated in FIG. 4), a search parameter "Coffee Shops" has been entered in the search field 120. For this search parameter, the map application has performed a search, and has provided (1) a list of search results in the search card's list area 125, and (2) several position identifiers 350 on the portion of the map not covered by the search card in its intermediate, maximized and minimized states. Some of these position identifiers are group identifiers 360 that identify two or more search results that are too close to each other to display individual identifiers for them. Group identifiers will be further described below by reference to FIG. 5.

As shown, the map display area 110 can display metadata (e.g., name of location, type of location, etc.) for the position identifiers 350, some of which are group identifiers that represent several locations as indicated by a number in the identifiers badge. Also, in its intermediate and maximized states, the search card's list display area 125 displays several pieces of information (e.g., a thumbnail picture, a name, a rating, a price indicator, etc.) for each location in the list.

In the first stage 302, the map application shows the search card 115 in its intermediate state, while a user holds the smartphone 100 in one hand. This stage 302 also shows the user's thumb touch selecting the map 320 displayed in the map display area 110 (i.e., shows the thumb contacting the phone's display screen at a location that displays the map). This touch operation causes the map application to slide down the search card 115 to its minimized state, as shown in the second stage 304.

Because the search card 115 is relatively short in its intermediate state, the user's thumb can easily reach over the search card in this state and tap the map in order to minimize this card. This tap operation provides an easy way for the user to eliminate the proactive display of the list of locations 125 when the user is not interested in this list. This selection directs the map application to provide an animation that slides the search card 115 down until only its search field 120 remains displayed at the bottom of the display screen, as illustrated in the second stage 304.

Figure 4:
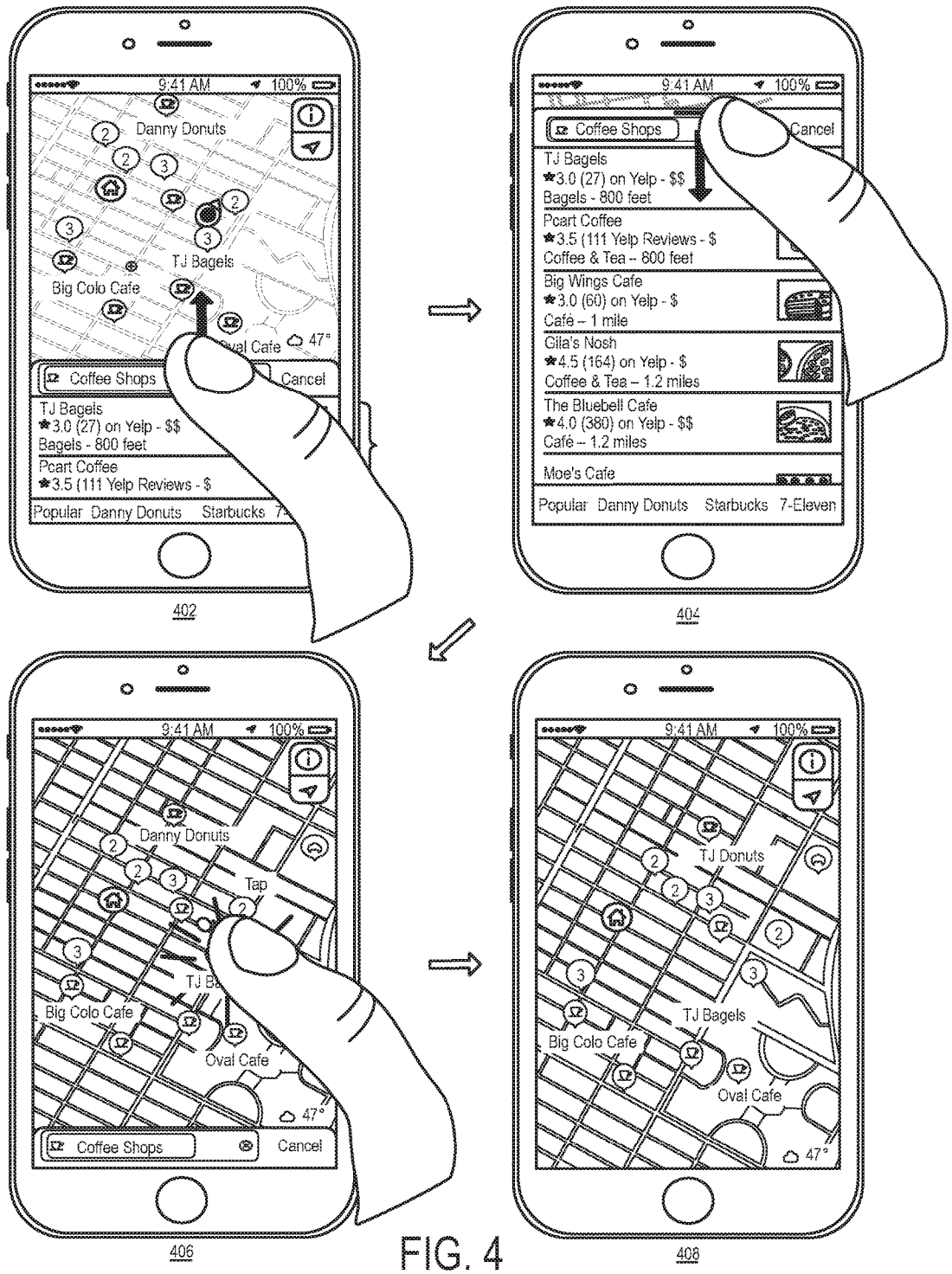

FIG. 4 illustrates several other ways to change the display state of the search card 115. The example illustrated in this figure is presented in four operational stages 402-408 of the map application. The first stage 402 shows the search card 115 in its intermediate state. This stage also shows the user selecting the top of the search card with his thumb (e.g., of the hand holding the phone) and performing an upward drag operation.

The second stage 404 shows that the drag operation of the first stage 402 causes the map application to slide the search card up to assume its maximized state. This stage also shows the user's thumb selecting the top of the search card and performing a downward drag operation. The downward drag operation directs the map application to slide down the search card to assume its minimized state, as shown in the third stage 406. To drag the card from its maximized state to its minimized state, the user can drag the card past (e.g., a threshold distance past) its intermediate state from its maximized state.

In some embodiments, the user can drag the search card 115 up or down (i.e., can make the search area larger or smaller) by selecting other locations in the search card 115 and performing up or down operation. Some embodiments, however, do not make the search area larger or smaller in response to drag operations on the list area 125 of the search card 115, because such drag operations are used to scroll through the locations in this area. In yet other embodiments, such drag operations only scroll through the location in this area when the search card is in its maximized state, and drag operations that are performed on positions in the list area 125 when the search card is in its intermediate state direct the map to increase or decrease the size of the search card.

In some embodiments, the user can also perform a flick operation to move a card (e.g., a search card 115) between its minimized, intermediate, and maximized states. To perform a flick operation in some embodiments, the user can select a location on the card (e.g., the top of the card) and perform an upward or downward drag operation that has a velocity or acceleration that is greater than a first threshold velocity or acceleration value. By having the threshold velocity or acceleration, this flick operation allows the user to push the card to the next displayed state (e.g., from the intermediate state to the maximized or minimized state, from the minimized state to the intermediate state, or from the maximized state to the intermediate state) without maintaining the drag contact as long as it would be needed when the drag operation does not have the threshold velocity or acceleration. When the flick's drag operation has a velocity or acceleration that is greater than a second, larger threshold value, the flick operation in some embodiments can have the card skip the intermediate state and transition from the maximized state to the minimized state, or from the minimized state to the maximized state. This stronger flick operation is referred to as a strong flick operation below.

The third stage 406 of FIG. 4 shows the user's thumb touch selecting the map displayed in the map display area 110. As shown by the fourth stage 408, this tap operation while the search card 115 is in its minimized state directs the map application of some embodiments to remove the card from the display screen, i.e., to move the card into its off-screen state. In some embodiments, the map application allows the user to move a card from its minimized state to its off-screen through other input. As mentioned above, the user can remove a minimized search card by selecting the cancel control 172 in some embodiments. Also, in some embodiments, the user can move a minimized card off-screen by selecting this card and performing a downward drag operation. In the example illustrated in FIG. 4, the map application displays weather, position and information controls 375, 380 and 385 on the map when the search card is in its off-screen state, as shown in stage 408. In other embodiments, however, the map application removes all controls that it previously displayed over a map in the map display area when it moves a card to its off-screen state, so that the user can have an unobstructed view of the map, as mentioned above.

In some embodiments, the map application provides other novel controls for adjusting the display state of the search card. For instance, the map application transitions the search card from its intermediate state to its minimized state, when it detects a particular user interaction with the map display area 110 that exceeds a threshold interaction amount while displaying the search card in its intermediate state. One example of the particular user interaction is the user panning the map in the map display area 110 by dragging the map by more than a threshold panning amount. Another example is the user rotating the map in the map display area 110 by more than a threshold rotating amount. Yet another example is the user zoom the map in the map display area 110 by more than a threshold zoom amount. Not all of these operations minimize the search card in some embodiments.

Figure 5:
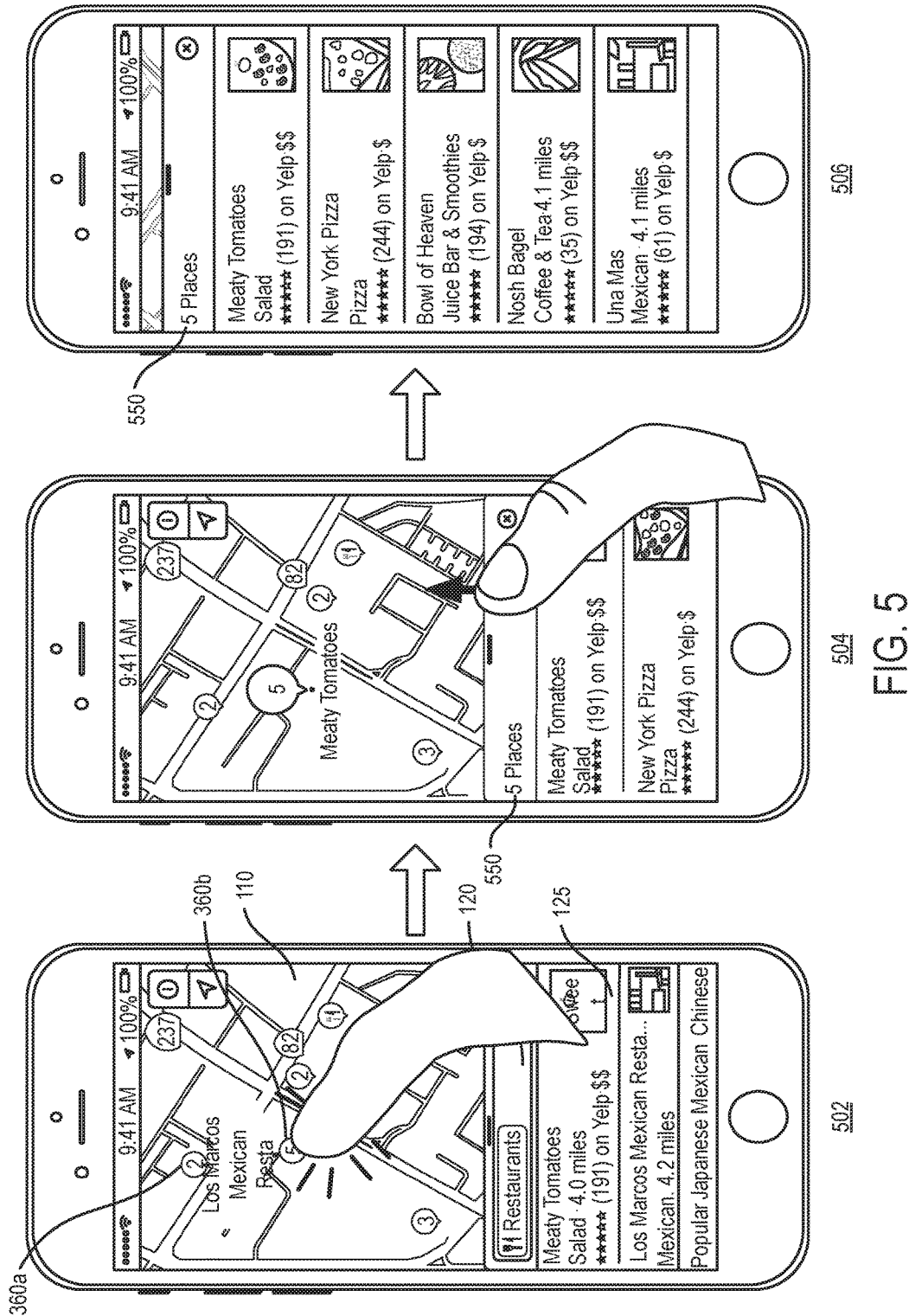

As mentioned above, the map application of some embodiments might display group identifiers in the map display area 110, in order to identify two or more search results that are too close to each other to display individual identifiers for them. FIG. 5 presents an example that illustrates how the search card of some embodiments facilitates interactions with the group identifiers. This example is illustrated in three operational stages 502-506.

The first stage 502 illustrates that a search parameter "Restaurants" has been entered in the search field 120 of the search card 115. In response to this search parameter, the search card's list area 125 identifies several search results, and the map display area 110 displays several identifiers 350 and 360 to identify the locations of the search results on the map. Each search result group identifier 360 represents multiple search results that are located too close to each other to have individual identifiers. Having individual identifiers for locations that are too close to each other would not provide useful information to the user and would not provide an aesthetically pleasing map presentation. Each group identifier includes a number within the identifier to indicate the number of locations represented by the identifier. For example, the group identifier 360a specifies 2 on its face to indicate that it represents the location of two restaurants, while the group identifier 360b specifies 5 on its face to indicate that it represents the location of five restaurants.

The first stage 502 also shows the user selecting the group identifier 360b. The second stage 504 that in response to this selection, the map application changes the appearance of the group identifier 360b (e.g., makes this identifier larger) in order to differentiate it from the other identifiers and thereby indicate that it has been selected. The second stage 505 also shows that in response to the selection of the group identifier 360b, the search card has been replaced with a general information card 550 for the selected group identifier 360b. This card 550 provides a list of the locations represented by the selected group identifier 360b, and provides a number at its top that specifies the total number of listed locations.

As shown in the second stage 504, the general information card 550 initially opens in an intermediate state, which can be expanded to the maximized state (e.g., through a drag operation as shown). The third stage 506 illustrates the general information card 550 in its maximized state. In the maximized state, this card can be scrolled to view any entry that does not fit in the maximized search card. This scrolling ability is not available in the intermediate general information card 550 in some embodiments, while it is also available in the intermediate general information card 550 in other embodiments.

In some embodiments, the search card can remain stationary on the display screen without user input in its three displayed states: the minimized state, the intermediate state and the maximized state. Also, in some embodiments, the map application allows the search card to appear in a display state between the minimized and intermediate states, or between the intermediate and maximized states, but requires the user to hold the search card in such a state (e.g., by providing input to move it to such a state and maintaining input to hold it in this state). In other embodiments, the map application allows the search card to remain stationary in a state between minimized and intermediate states, or between the minimized and maximized states.

Figure 6:
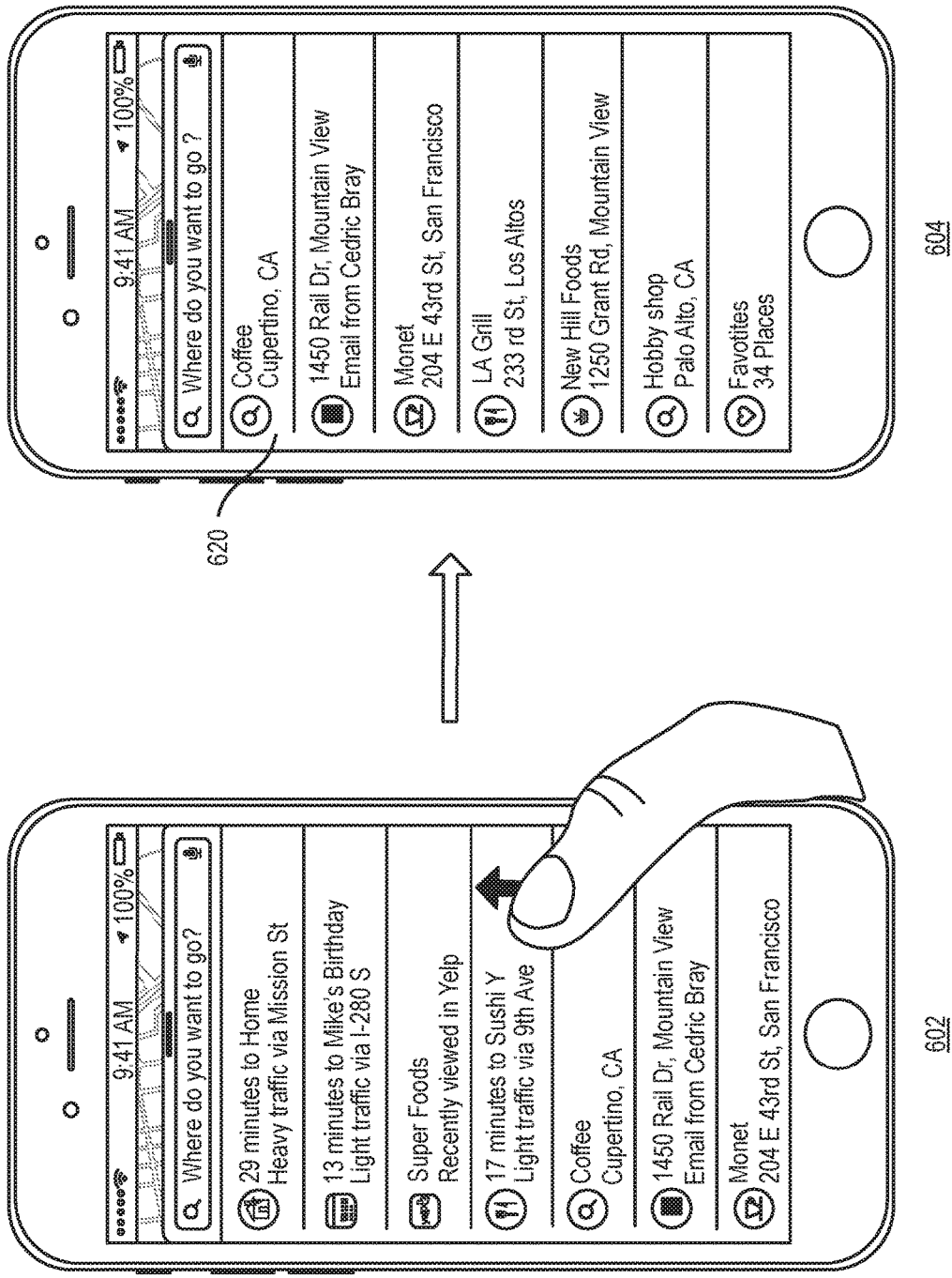

As mentioned above, a user cannot scroll a card's content while the card is in its intermediate state, but can scroll this content when the card is in its maximized state. FIG. 6 illustrates the user performing such a scroll operation while the search card is in its maximized state. This scrolling allows the map application to list additional locations to the user.

FIG. 6 shows two operational stages 602 and 604 of the map application of some embodiments. The first stage 602 shows the search card 115 after it has been opened to its maximized state. In this stage, the search card in this example has not received any search parameter, and is displaying a list of predicted locations for display on the map. The first stage 602 also shows the user performing a drag operation, by using his thumb to select a location on the list of predicted locations (i.e., to touch the phone's display screen at a position that displays the list of predicted locations) and moving his thumb upwards.

The second stage 604 shows that in response to this drag operation, the map application scrolls the predicted-location list upwards. As shown, the thumb of the hand that holds the phone 100 can easily scroll through the displayed content of a card in its maximized state. In other words, this operation is yet another convenient one-handed interaction that is facilitated by the map application. The scrolling between the first and second stages 602 and 604 has moved entry 620 for Coffee Shop in Cupertino from a lower position in the first stage 602 to the top of the list. Because of this scrolling, four entries on the predicted-location list have scrolled off the list, while four other entries on this list are now displayed on this list. One of the new entries is the favorites folder, which in this example includes thirty-four locations. In some embodiments, the favorites folder is the last item shown in the list of suggested locations of the search card. In other embodiments, the location of the user's car is the last item shown in the list of predicted locations.

As mentioned above, the search card in some embodiments displays a set of metadata for each predicted location that it displays. One example of such metadata is a source identifier that specifies a source from which the predicted location was obtained. Sources for the predicted locations in some embodiments include the different applications from which an address is harvested on the mobile device, and the programs or framework services that identified frequent locations traveled to by the device. Other examples of metadata displayed for predicted locations include travel time to the predicted location, the road to take to the predicted location, traffic congestion on a route to the predicted location, status of a transit line to use to reach the predicted location, a time for a reservation at the predicted location, a position in a reservation queue for a reservation at the predicted location, a time of an associated event at the predicted location, etc.

Several examples of such metadata are illustrated in several of the above-described figures and are further illustrated in several of the figures described below. For instance, the search card illustrated in the first stage 202 of FIG. 2 presents several sets of metadata for several of its predicted locations.

For instance, in this figure, the map application offers the device's home as the first predicted location 252 in the search card 115. The map application not only refers to the location as Home, but also uses a home icon 353 to pictorially represent the home location. For this location, the map application's provided metadata specifies that it will take 29 minutes to travel to Home, and there is heavy traffic via Mission St.

The second prediction 254 in FIG. 2 is about a calendared event. The exact location for this event is not specified by the entry 254 in the search card. Instead, the entry describes the event (Mike's Birthday), the time to the event (13 minutes), and provides a calendar icon to identify the source for this event. The entry 254 also specifies that there is light traffic along the route to this event (along I-280 S). In some embodiments, the search card displays the address of a predicted location that is associated with a calendar event.

The third prediction 256 is Super Foods supermarket. For this supermarket, the map application provides a Yelp icon and a text description (Recently Viewed in Yelp) to identify the source for this prediction. In some embodiments, the map application obtained Super Foods location from the Yelp application, when the Yelp application (1) donated this location as an address listed on a page that it presented to a user or (2) used a location service of the map application for this location.

The fourth prediction 258 relates to a restaurant (Sushi Y). The exact location for this restaurant is not identified by this restaurant's entry 258 in the search card. Instead, the entry describes the travel time to this restaurant (17 minutes), specifies that there is light traffic along the route to this event (via 9$^{th}$ Ave), and provides a dinning icon 272 to identify that the entry relates to a restaurant.

The fifth prediction 260 relates to a recent search that the map application performed for "Coffee" in Cupertino, Calif. (e.g., after the search query "coffee" was entered while the map application displayed Cupertino). The search icon 274 identifies the search. The sixth prediction 262 is an address harvested from an email. In this entry, the address is displayed with an address icon 276 and with an identification of the sender of the email. Lastly, the seventh prediction 264 is a coffee shop that was recently displayed by the map application. This prediction identifies the name and address of the coffee shop.

Figure 7:
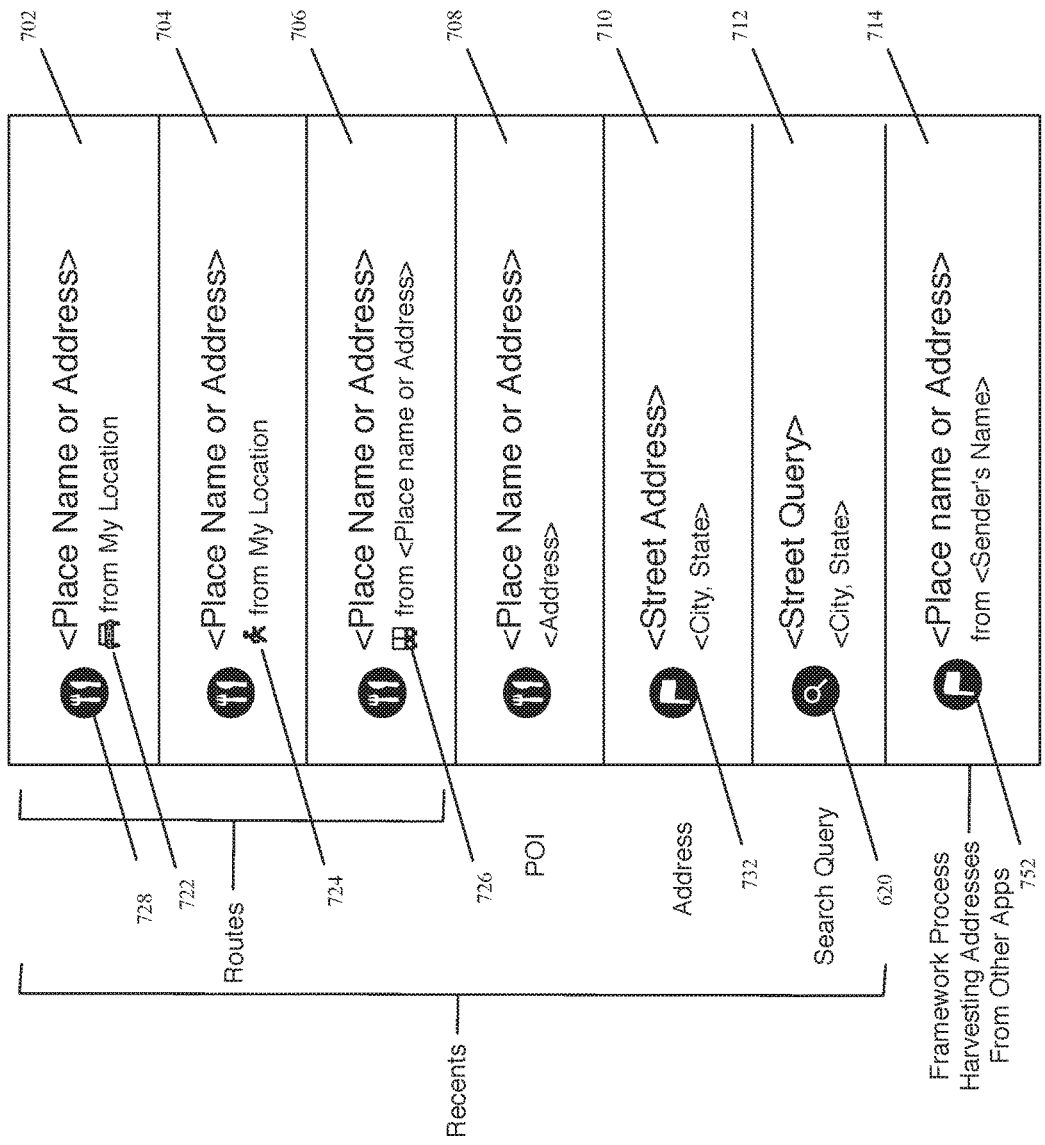
FIGS. 7-10 illustrate one set of design rules that the map application of some embodiments uses to identify and arrange the type of metadata to display for the various different predicted locations listed in the search card.

FIGS. 7-10 illustrate one set of design rules that the map application of some embodiments uses to identify and arrange the type of metadata to display for the various different predicted locations listed in the search card. FIG. 7 illustrates the design rules that some embodiments use to select and arrange the types of metadata displayed for recent items viewed on the map. These recent items include (1) three locations 702-706 for which the map application recently identified routes, (2) one recently viewed POI 708, (3) one recently viewed address 710, (4) a recently submitted search query 712, and (5) one address 714 recently harvested by an OS framework process of the smartphone 100 from an electronic communication (e.g., email, text message, etc.) received on the phone. Other than the address 714, the other addresses 702-712 in some embodiments are addresses maintained by a "Recents" process of the map application, which stores addresses that the map application recently displayed or processed in a search.

As shown, the design rules in some embodiments identify each recently viewed route 702, 704 or 706 in terms of the location name or address. An icon also identifies this location. In this example, this icon is the dinning icon 728 as it is assumed that the location is a restaurant for each of these addresses 702, 704, or 706. Also, each of the routes has an icon that specifies the type of route. Specifically, a car icon 722 is provided for the driving route 702, a walking man icon 724 is provided for the walking route 704, and a bus icon 726 is provided for the transit route 706.

The design rules in some embodiments identify a recently viewed POI 708 in terms of the POI's name and address, along with an icon that identifies the type of POI. Also, in some embodiments, the design rules identify an address 710 that is recently viewed on the map in terms of the street address, plus the city and state information. An address icon 732 also represents the recently viewed address 710. In this example, the address icon is a flag 732 to indicate the address was a location of a dropped pin.

As shown in FIG. 7, the recent search query 712 is identified in some embodiments in terms of the search string used for the query, along with the city and state for which the search was performed. The search query 712 is further described by reference to the search icon 734, in order to highlight that the entry is being listed in the search card's list area 125 because of a recently performed search. FIG. 7 also shows that an address that is harvested by an OS framework process is displayed as an entry 714 in terms of a location name or address, a location icon 752, and the name of the sender of the electronic communication from which the address was harvested.

Figure 8:
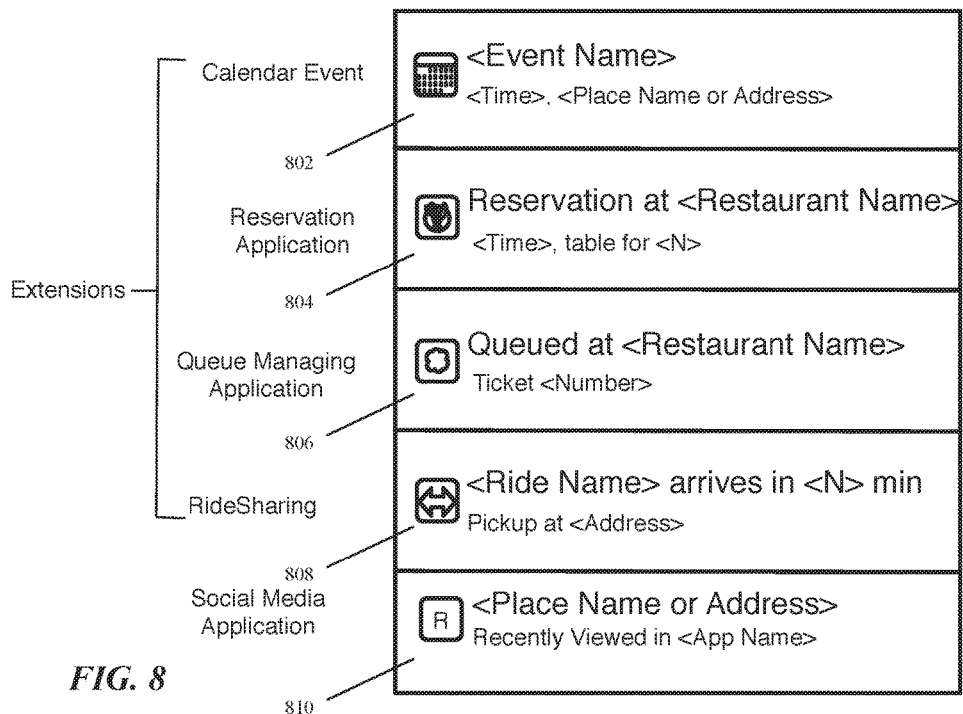

FIG. 8 illustrates the design rules that some embodiments use to select and arrange the types of metadata displayed for predicted locations obtained from (1) applications that are associated with extensions to the map application and (2) applications that donate locations to the map application or to other applications executing on the phone 100. When a particular application has an associated extension for the map application, a user can interact with the particular application seamlessly through the map application without having to open the particular application.

In the example illustrated in FIG. 8, the applications with the associated extensions are a calendar application, a restaurant reservation application, a restaurant waitlist application, and a ride sharing application. The application that donates locations to the map application is a social media review application.

As shown, the design rules in some embodiments identify a predicted location 802 for a calendar event in terms of the event name, the time for the event, and either the location name or address for the event. In some embodiments, the design rules use the location name if one is provided in the calendar entry, but otherwise use the address for the event. A calendar icon also identifies the predicted item as one associated with a calendared event.

The design rules in some embodiments identify a predicted location 804 for a restaurant reservation that is made through a reservation application that has a map application extension in terms of the restaurant name, the time for the reservation, number of parties in the reservation, and the logo of the reservation application. Analogously, for a restaurant queue management application that specifies a user's place in a waitlist, the design rules in some embodiments express the restaurant's location entry 806 in terms of the restaurant name, the position in the waitlist, and the logo of the waitlist application.

For a pickup location Obtained from ride sharing application that executes on the device, the design rules in some embodiments express the pickup location 808 in terms of the ride name, expected arrival time (in minutes in this example), a pickup location, and the logo of the ride sharing application. Lastly, the design rules in some embodiments identify a location 810 that is donated by a social media review application in terms of the name or address of the location (e.g., name if a name is available, otherwise a location), and text and logo identification of the social media review application that donated the location.

Figure 9:
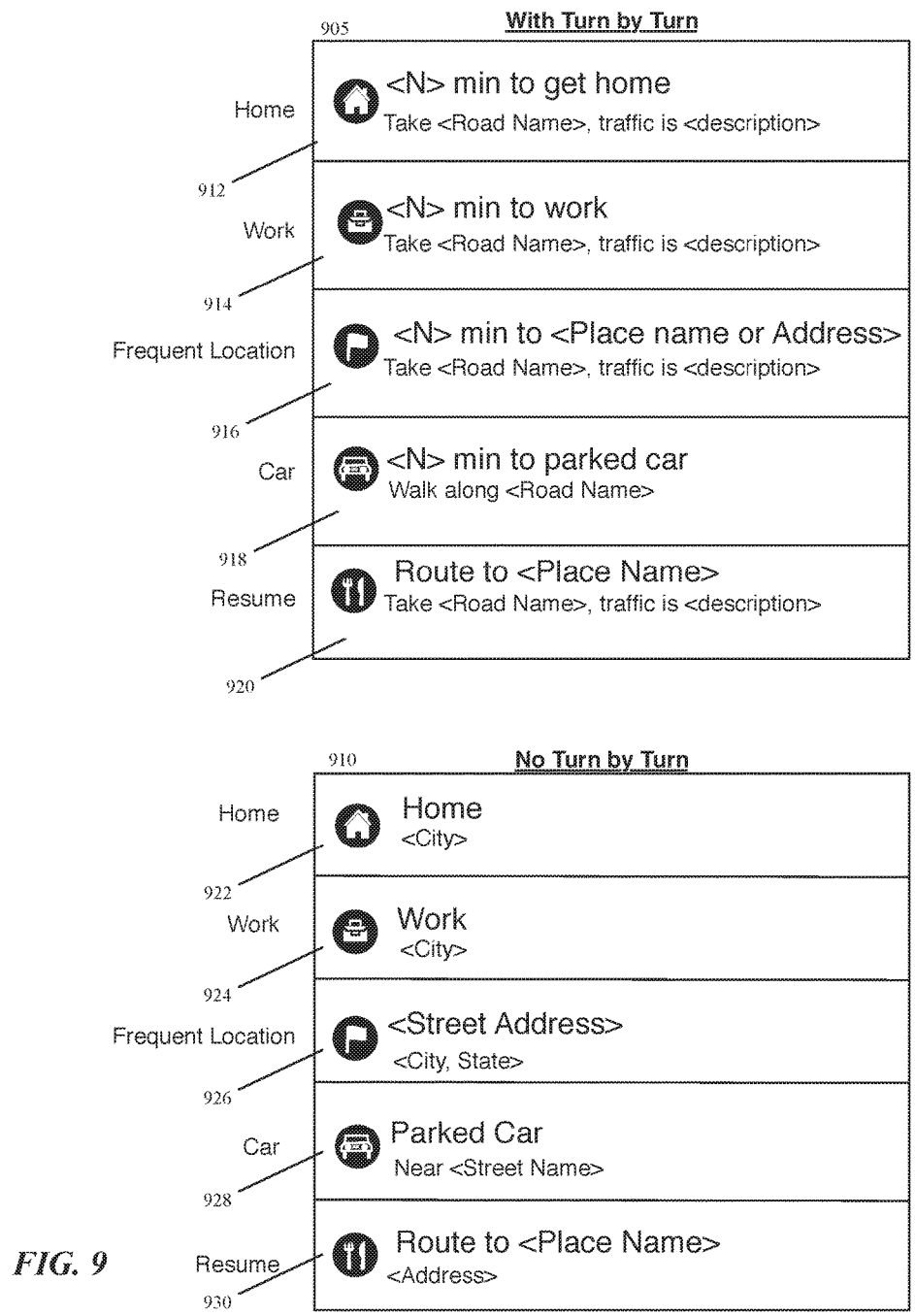

FIG. 9 illustrates that the design rules of some embodiments specify two different sets of metadata to be displayed for the same type of locations in two different regions, depending on whether turn-by-turn navigation is an available feature of the mobile device in the region. The mapping application of some embodiments provides turn-by-turn navigation to a selected location. However, in some embodiments, this feature is not available in all regions (e.g., navigation might be available in some countries but no others)

The design rules in FIG. 9 are illustrated in two halves 905 and 910. The top half 905 illustrates the design rules for regions with turn-by-turn navigation, while the bottom half 910 illustrates the design rules for regions without turn-by-turn navigation. As shown, the first three rules 912, 914 and 916 in the top half 905, specify that, for regions with turn-by-turn navigation, a time to the location (in minutes in these examples) should be displayed as metadata for predicted locations in the search card that are a home location, a work location, and a frequent destination location of the mobile device. For these three classes of predicted location, these three rules also (1) specify the traffic level along each route to each of these locations when driving is the predicted mode of travel to these locations, and (2) suggest a road to take to each of these locations.

The fourth design rule 918 in the top half 905 describes how the map application should display a location of the user's parked car as one of the predicted locations. The fourth design rule 918 specifies that, in a region with turn-by-turn navigation, the location of the car should be offered as a predicted location along with (1) a suggest a road to walk to get to the car, and (2) the time (in minutes in these examples) to get to the car. In some embodiments, the map application predicts the mode of travel (walk, drive, transit, etc.) based on (1) the distance to the location, (2) previous travel to the location, (3) the user-preference settings that specify the user's preference, and/or (4) the current transportation mode of the map application. Other embodiments account for other factors in their heuristics in determining the mode of travel to the predicted location.

In some embodiments, the map application allows a user to interrupt a navigation presentation for a first navigated route to navigate along a second route to another location near the first navigated route. In some of these embodiments, the map application provides the destination of the first navigated route when the device leaves the destination of the second route. The fifth design rule 920 in FIG. 9 illustrates that in some embodiments the map application should display the destination of the first navigated route in terms the destination's name, traffic conditions along a road along this route, and a suggestion to take another road when traffic conditions are bad.

As mentioned before, the bottom half 910 of FIG. 9 illustrates the design rules for illustrating locations in regions without turn-by-turn navigation. The first two rule 922 and 924 in the bottom half 910, specify that for regions without navigation, the city address should be displayed as metadata when the home and work locations are displayed in search card. The street address is not provided for these locations in some embodiments in order to maintain the privacy of the user as this data in these embodiments can also appear on the lock-screen of the device. In other embodiments, the street address is provided for the home and work locations displayed in the search card.

The third design rule 926 specifies that the city and state should be provided for a frequent location location in regions without navigation. The fourth design rule 928 specifies that the location of the user's parked car should be identified in terms of a nearby street name. The fifth design rule 930 specifies the destination of the first navigated route should be identified in terms of its name and address. All of design rules illustrated in FIG. 9 also specify the location entry's associated icon should match the location's type.

Figure 10:
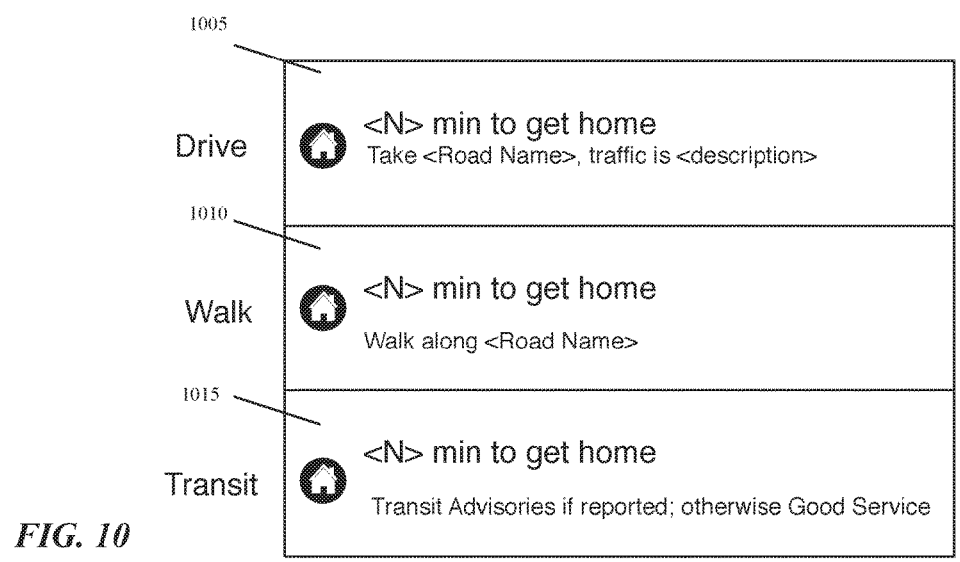

FIG. 10 illustrates that the design rules of some embodiments specify different sets of metadata to be displayed when the map application predicts different modes of travel to the same type of predicted locations. The first design rule 1005 is identical to the first rule 912, which was described above by reference to FIG. 9. The rule 1005 specifies that the time to travel, a road in a driven route to the destination, and traffic along the route should be specified when a home location is displayed as a predicted destination in the search card. For the situation where the map application predicts walking as the navigation mode to a home location, the second design rule 1010 specifies that the time to walk to home and a road to use to get there should be specified when the home location is displayed as a predicted location in the search card.

The third design rule 1015 specifies how metadata should be displayed when the predicted navigation mode is transit navigation. This rule specify that the time to the location (in this case, the home location) should be provided (by reference to minutes in this case). It also specifies that if the map application identifies any transit advisory along a transit line along the route, it should specify the transit advisory with the predicted location. If no transit advisory is reported for any transit line along the route, the rule specifies that an indication of Good Service should be provided.

In some embodiments, the search card also provides a set of controls for performing one or more operations with respect to predicted locations that it lists. Examples of such controls include a sharing control for sharing a predicted location with others, an edit control for editing one or more displayed parameters for a location (e.g., for editing the name, or address of a location), a delete control for deleting a predicted location from the search card. The map application of a first device in some embodiments shares a record (1) by wirelessly transferring the record to a nearby second device (e.g., a nearby mobile device through a Bluetooth or WiFi channel), (2) by using a cloud based sharing service that is used by both first and second devices, and/or (3) by sending the record through electronic communication, such as email, text message, etc.

A user can access these controls for a location by performing a swipe on the location's displayed record (e.g., a swipe gesture on the mobile device's touch sensitive screen at the position displaying the location's record) to cause the location's record to slide over to reveal one or more of these controls, which can then be selected. FIG. 11 illustrates one example of such a swipe gesture in two operational stages 1102 and 1104. The first stage 1102 shows the user performing a swipe on the predicted location of his parked car. The second stage 1104 shows that this swipe gesture resulted in the display of three controls for sharing the location of the parked car, or editing a parameter of the record displayed for this location.

FIG. 12 illustrates different sets of actions that are available for different location records in the search card of the map application of some embodiments. As shown, share and edit controls are available for home, work and parked car records 1202, 1204, and 1206 in some embodiments. In some embodiments, the edit control for these records allows the user to modify the address associated with these records. For instance, in some of these embodiments, selection of the edit control opens a pane in which the user can type in an address, or opens a map on which the user can move a pin to identify the address.

As shown in FIG. 12, share, edit, and delete controls are available for a frequent location record 1208 in some embodiments. The edit control for such a record allows the name of the location to be modified (e.g., from a physical address to a name of business or person residing at the location). The delete control for this record is provided to allow this record to be removed from the search card as it might not be of interest to the user or to maintain the user's privacy. In some embodiments, the delete control is not provided for the location record 1208.

Share and delete controls are also provided for route destinations, nearby gas stations, locations donated by other applications, and places recently viewed on the map, as shown by records 1210-1220. The delete control is the control provided in some embodiments for a recent search query 1222 (i.e., a recent set of strings entered in the search field of the search card) performed by the map application. For location records 1224-1230 obtained from other applications that use map application extensions, some embodiments provide share and edit controls. For these records, the edit controls allow the user to edit the name of event, restaurant, and ride provided by these records.

In some embodiments, a prediction engine executes on the mobile device (1) to analyze candidate locations from various sources on the mobile device, such as those described above, and (2) to identify a sorted list of predicted location based on this analysis. The prediction engine in some embodiments includes (1) a filter for eliminating irrelevant or uninteresting addresses, (2) a de-duplicator for eliminating duplicate records collected from different sources for the same location, (3) a data augmenter for improving the data for the locations that are not filtered out by the filter or de-duplicator, and (4) a sorter for organizing the predicted locations in a particular sorted order. The prediction engine also includes a tracker in some embodiments that correlates the location of the mobile device and one or more of the predicted locations, and for these locations, generates travel data for display with each of these predicted locations, as further described below.

In some embodiments, the prediction engine has multiple clients on the mobile device for its analysis. One of these clients is the proactive search card of the map application. Other clients on the mobile device include (1) a predicted travel display area that is accessible on the mobile device without opening the map application (e.g., is a display pane accessible off the home page of the mobile device), (2) a display pane that is opened for the map application in response to a force touch input with respect to the map application, (3) a display area on a watch paired with the mobile device, and (4) a display area on a vehicle information display system being driven by the map application. The prediction engine has a prediction limiter for each of its different clients, and each client's limiter discards all but N predicted locations for that client, where N is an integer that is custom selected for that client. For each of its client, the prediction engine also has a sorter for reordering the predicted locations generated for the client based on heuristics that are specified for the client.

Figure 13:
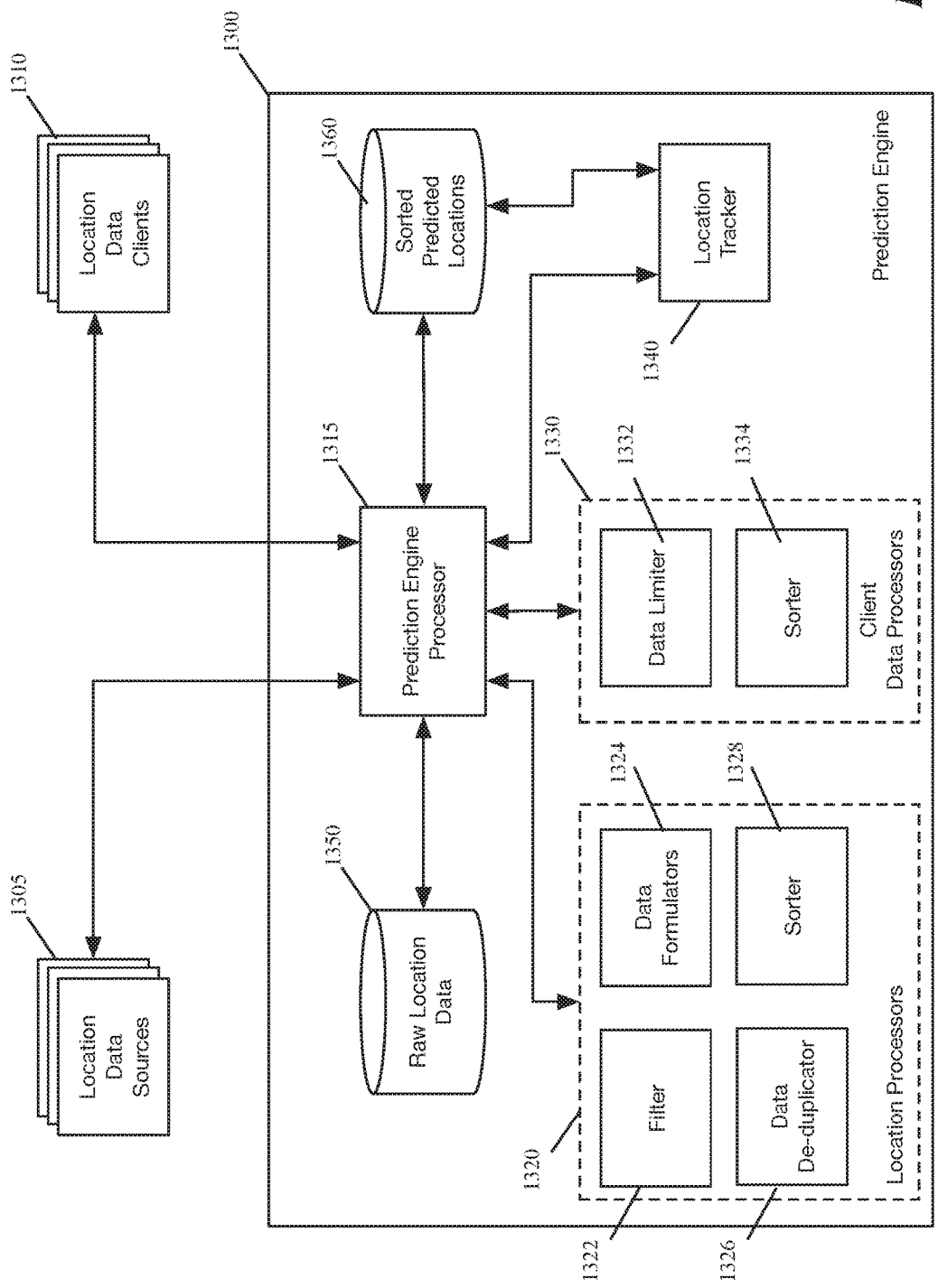
FIG. 13 illustrates a location prediction engine of the mobile device of some embodiments of the invention.

FIG. 13 illustrates a location prediction engine 1300 of the mobile device of some embodiments of the invention. This engine receives location data from a variety of data sources 1305, analyzes this data to produce a sorted list of predicted locations that are relevant for a current location of the mobile device and/or the current time, and provides to a variety of location data clients 1310 one or more lists of predicted locations. As shown, the prediction engine 1300 includes a prediction-engine processor 1315, a set of location processor 1320, a set of client-data processors 1330, a location tracker 1340, a raw data storage 1350 and a processed data storage 1360.

The location data sources in some embodiments include (1) the map application, (2) an OS framework process that harvests address from applications (e.g., electronic mail applications, text messaging applications, ticket applications, calendar application, restaurant reservation applications, social media applications, real estate applications, etc.) executing on the mobile device, and (3) an OS framework process that identifies locations previously traveled to by the mobile device. The map application in some embodiments has a Recents database that stores addresses recently entered in the search card's search field, and/or locations (e.g., POIs) and routes previously examined on the map in the map display area. This database is used as one of the location data sources in some embodiments. Also, in some embodiments, the location data sources 1305 also include other devices associated with the mobile device (e.g., other devices of the user or belonging to the same account). A cloud synchronizing services in some embodiments synchronizes locations identified on a set of two or more related devices, and the prediction engine 1300 analyzes the locations that are locally and remotely identified to formulate the list of predicted locations. Examples of obtaining harvested and derived location data are described in several of the above-described U.S. Patent Applications, which have been incorporated herein by reference.

The prediction engine processor 1315 receives the location data from the location data sources 1305 and stores this data in the raw location data storage 1350. The processor 1315 uses the set of location data processors 1320 to process each received location record in real-time in some embodiments, and in batch in other embodiments. The location data processors include (1) a set of one or more filtering engines 1322 that analyze a location record to determine whether it should be discarded, (2) a set of data formulators 1324 that analyze, and when applicable adjust, the metadata description of the location record, (3) a de-duplicating engine 1326 that determines whether the location record should be discarded as it is a duplicate of another record, and (4) a sorting engine that computes a score for a location record that is not discarded (e.g., due to filtering or de-duplicating) so that the location record can be placed in a sorted order with the rest of the location records that are not discarded.

The prediction engine processor 1315 stores in the processed location data storage 1360 the processed location records that remain after the processing by the set of location processors 1320. The prediction engine processor 1315 directs the location tracker 1340 to track a subset of the predicted locations that have records in the processed data storage 1360, in order to maintain travel data (e.g., estimate time of arrival, traffic data, etc.) to these locations and store this travel data in the processed data storage 1360. In some embodiments, the prediction engine processor 1315 directs the tracker 1340 to maintain travel data to the predicted home location, predicted work location, and frequent locations identified by the OS framework process that identifies locations frequently traveled to by the mobile device. In some of these embodiments, the processor 1315 has the tracker only track these locations because generating travel data for all of the predicted locations might consume too many resources of the mobile device.

At any given time, the tracker in some embodiments produces the travel data for a predicted location by identifying the current location of the device at that time, and using a routing engine (e.g., a remote routing server that the tracker accesses through the mobile device's network interface) to identify a route from the device's current location to the predicted location. From this route, the tracker in some embodiments derives the travel data for the predicted location. In some embodiments, the route engine produces some or all of the travel data (e.g., produces the traffic data) and supplied this travel data to the tracker in response to the tracker's request. The tracker in some embodiments stores the travel data that it derives and/or receives in the processed data storage 1360 along with the predicted location records.

The prediction engine processor 1315 handles requests for lists of predicated locations that it receives from the location data clients 1310. Examples of location data clients 1310 in some embodiments include (1) the controller that is responsible for populating the proactive search card, (2) a process executing on a smart watch connected to the mobile device executing the prediction engine 1300, (3) a notification manager that populates a notification center or notification pane that is accessible outside of the map application, (4) a module on the mobile device that drives a vehicle information display system to display content supplied by the mobile device, and (5) a framework OS process that produces a display pane to show a subset of map application output data when force touch is received with respect to the map application.

In some embodiments, a location data client requests a list of predicted location based on the occurrence of an event, e.g., the opening of the proactive search tray, the request to display a notification pane, receiving a force touch input, etc. Conjunctively, or alternatively, a location data client 1310 in some embodiments requests a list of predicted locations after it receives a notice from the prediction engine processor that it has updated a previous sorted list of predicted locations to produce a new sorted list of predicted locations.

After receiving the request from a location data client 1310, the prediction engine processor 1315 uses the client data processors 1330 to process the current list of predicted locations for the requesting client, and then provides the processed list to the client. As shown, the client data processor 1330 includes a data limiter 1332 and a sorter 1334. In some embodiments, each client's data limiter 1332 discards all but N predicted locations for that client, where N is an integer that is custom selected for that client. Each client's sorter 1334 then reorders the remaining predicted locations based on a set of criteria that are specified for the client 1310. The processor 1315 then provides this sorted list to the requesting location data client 1310.

Figure 14:
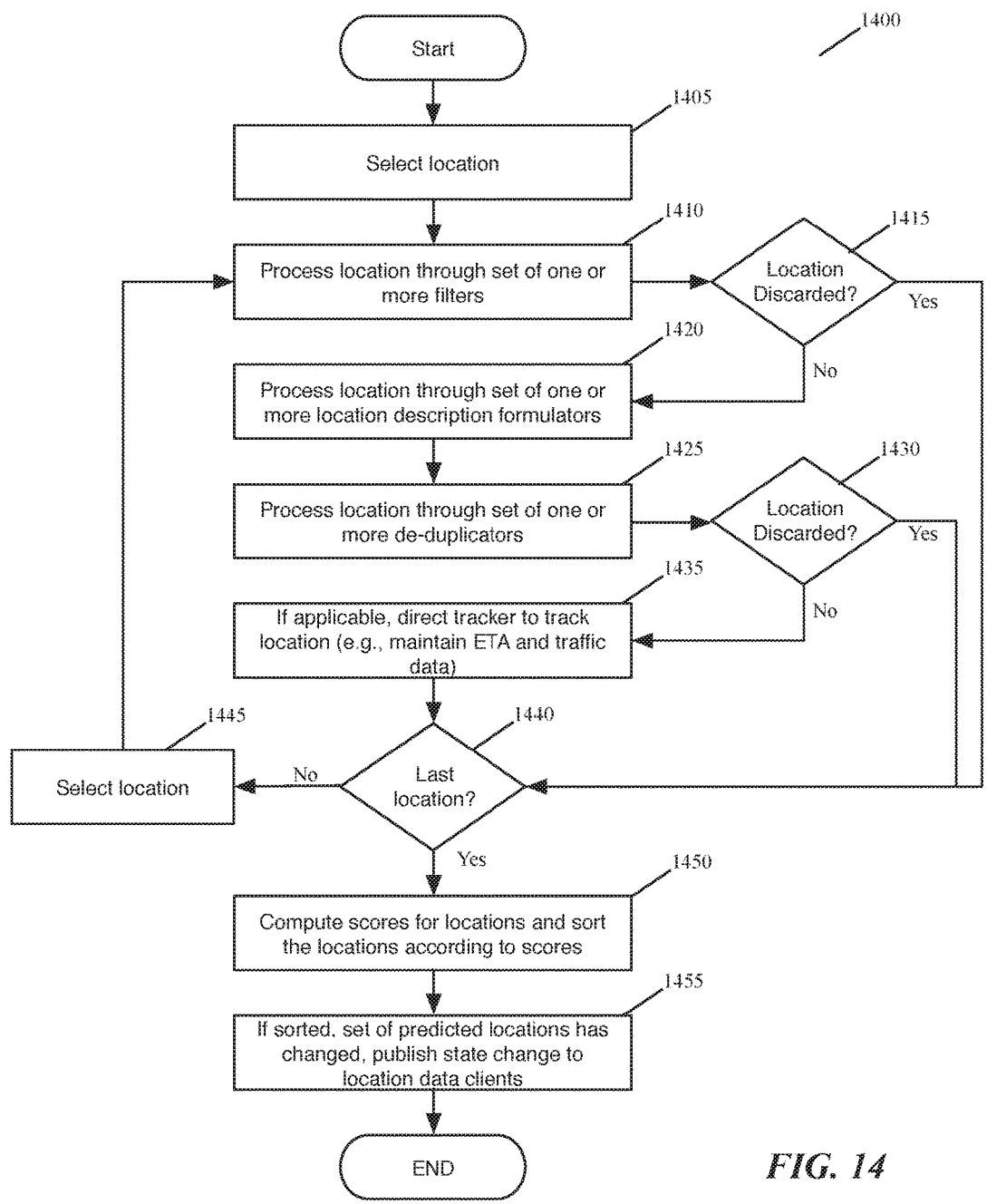
FIG. 14 illustrates a process that analyzes a set of one or more raw location records in the raw data storage.

The operation of the prediction engine processor 1305 will now be further described by reference to processes 1400 and 1500 of FIGS. 14 and 15. The process 1400 illustrates several operations that this processor 1305 performs to process a set of one or more raw location records in the raw data storage 1350. As shown, the process 1400 initially selects (at 1405) a raw location data record. Next, at 1410, the process directs a set of one or more filters 1322 to analyze the raw location data to determine whether the location record should be discarded. When more than one filter is used, the process iteratively calls each filter and stops calling the other filters when any one of the filters returns a decision to discard the selected location record. In some embodiments, different filters are used to make the design of the prediction engine more modular and to make adding new filters to, or removing other filters from, this engine easier. Different filters use different criteria for determining whether a location record should be discarded.

At 1415, the process determines whether any filter specified that the selected location record should be discarded. When at least one filter specifies that the record should be discarded, the process transitions to 1440. Otherwise, the process transitions to 1440. For some embodiments, the operation 1415 is conceptual as the process 1400 discards the selected location, and transitions immediately to when any one of the filter operations specifies that the selected location should be discarded.

At 1420, the process 140( )directs a set of one or more data formulators 1324 to analyze the selected location's raw metadata and when applicable, to adjust this metadata description. In some embodiments, the prediction engine 1300 uses different data formulators 1324 to make the design of the prediction engine more modular and to make adding new data formulator to, or removing other formulators from, this engine easier.

After 1420, the process 1400 directs (at 1425) a set of one or more de-duplicators 1326 to analyze the selected location record to determine whether the location record should be discarded as it is a duplicate of another record that the process previously processed. When more than one filter is used, the process iteratively calls each de-duplicator and stops calling the other de-duplicators when any one of the filters returns a decision to discard the selected location record. When a de-duplicator determines that the selected location record is a duplicate, the de-duplicator 1326 in some embodiments determines whether any metadata piece of the selected location record should be maintained, and if so, uses this piece to update the previously processed location record that is a duplicate of the selected location record.

At 1430, the process determines whether any de-duplicator specified that the selected location record should be discarded. When at least one de-duplicator specifies that the record should be discarded, the process transitions to 1440. Otherwise, the process transitions to 1435. For some embodiments, the operation 1430 is conceptual as the process 1400 discards the selected location, and transitions immediately to 1440 when any one of the de-duplicating operations specifies that the selected location should be discarded.

At 1435, the process directs the tracker 1340 to track the selected location if this location belongs to a class of locations that should be tracked, in order to produce travel data (e.g., estimate time of arrival, traffic data, etc.) for it and store this travel data in the processed data storage 1360. In some embodiments, the process 1400 directs the tracker 1340 to maintain travel data to the predicted home location, predicted work location, and frequent locations identified by the OS framework process that identifies locations frequently traveled to by the mobile device. In other embodiments, this process does not direct the tracker to track one of more of these location types, and/or directs the tracker to track other location types (e.g., locations of upcoming calendar events, or locations of upcoming reservations). In some embodiments, one of the data formulators 1324 sets a bit in the selected location's metadata to notify the process 1400 that it should direct the tracker 1340 to track the selected location.

At 1440, the process 1400 determines whether it has examined all the location records that it has to process from the raw data storage 1350. If so, the process transitions to 1450. Otherwise, the process selects (at 1445) another location record that has to be analyzed, and then transitions back to 1410 to perform one or more of the location data processing operations for this location.

At 1450, the process computes a score for each predicted location that was not processed in this iteration of the process 1400 and was not discarded due to any filtering or de-duplication operation. In some embodiments, the process computes the score of a predicted location as a weighted sum of several scores for several parameters associated with the location. Different embodiments use different parameters. Some such parameters are the source from which the location was obtained, the time at which the location was identified or harvested, the proximity of the location to the current location of the device, etc. In some embodiments, one or more of the location data sources 1305 provides confidence scores for location records that they provide. In some such embodiments, the process 1400 uses these confidence scores as the weight parameters for computed the weighted sums, or as parameters to adjust the weight parameters. The above-described U.S. Patent Applications, which have been incorporated herein by reference, further describe sorting a predicted set of locations by computing scores for these locations.

Based on the computed scores, the process identifies (at 1450) a sorted list of predicted locations and stores these locations in the processed data storage 1310. When the process 1400 analyzes only a subset of new location data records, the process 1400 in some embodiments re-computes the scores for some or all of the locations in the processed data storage 1310 when it computes the scores of the new location data records. These re-computations allow the process to define a new sorted list of predicted locations that include new and old locations.

After 1450, the process 1400 notifies one or more location data clients 1310 of a change to the sorted list of predicted locations, when this sorted list was changed (at 1450) because of the processing of new location records. In some embodiments, the location data clients 1310 subscribe to a notification service of the prediction engine processor 1315 that sends these clients notifications when the sorted list of predicted locations is modified. Upon receiving such a notification, a location data client 1310 might request the updated list of predicted locations from the prediction engine processor 1400. When the list of predicted locations does not change (i.e., does not have a new location and does not have a different order for any previously identified locations), the process 1400 does not publish an update (at 1455) in some embodiments. After 1455, the process ends.

Figure 15:
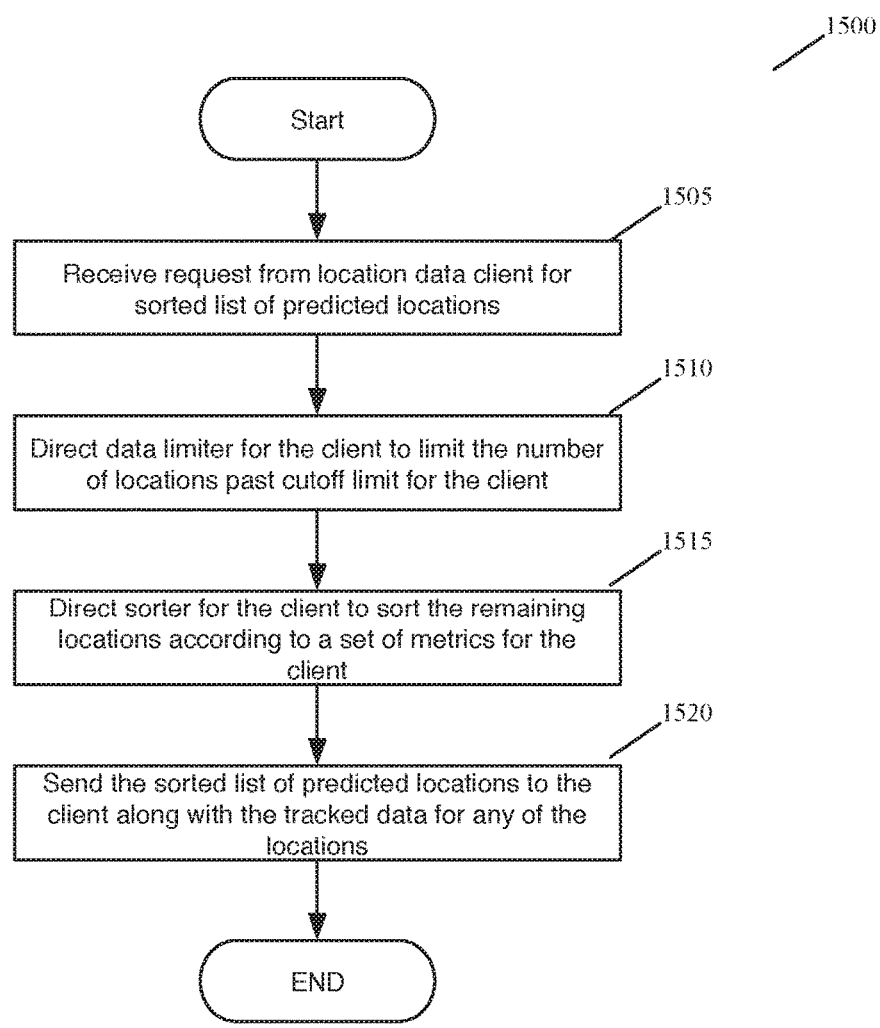
FIG. 15 illustrates a process that handles requests for lists of predicated locations that it receives from a location data client.

FIG. 15 illustrates a process 1500 that the prediction engine processor 1315 performs to handle requests for lists of predicated locations that it receives from a location data client 1310. In some embodiments, a location data client requests a list of predicted location based on the occurrence of an event, e.g., the opening of the proactive search tray, the request to display a notification pane, receiving a force touch input, etc. Conjunctively, or alternatively, a location data client 1310 in some embodiments requests a list of predicted locations after it receives a notice from the prediction engine processor that it has updated a previous sorted list of predicted locations to produce a new sorted list of predicted locations.

As shown, the process 1500 starts when it receives (at 1505) a request for a sorted list of predicted locations from a location data client 1310. The process (at 1510) retrieves its current sorted list of predicted locations and provides this list to the data limiter 1322 that is defined for the requesting location data client 1310. As mentioned above, the prediction engine in some embodiments has a different limiter 1332 for each of its different clients. Each client's limiter discards all but N predicted locations for that client, where N is an integer that is custom selected for that client.

After the limiter 1332 for the requesting client returns the filtered prediction list, the process 1500 directs (at 1515) a sorter 1334 for the requesting client 1310 to sort the filtered predicted location list based on a set of criteria that is specified for the client. As mentioned above, the prediction engine in some embodiments has a different sorter 1334 for each of its different clients, and each client's sorter performs its sort based on the set of sorting criteria that is specified for its client. After receiving the sorted, filter list of predicted locations, the process 1500 provides (at 1520) this list to the location data client 1310 that requested this list at 1505. The process 1500 then ends.

As mentioned above, the prediction engine 1300 of some embodiments formulates list of predicted locations for different sets of location data clients 1310 in different embodiments. Examples of location data clients 1310 in some embodiments include (1) the controller that is responsible for populating the proactive search card, (2) a process executing on a smart watch connected to the mobile device executing the prediction engine 1300, (3) a notification manager that populates a notification center or notification pane that is accessible outside of the map application, (4) a module on the mobile device that drives a vehicle information display system to display content supplied by the mobile device, and (5) a framework OS process that produces a display pane to show a subset of map application output data when force touch is received with respect to the map application.

For these different location data clients 1310, the prediction engine 1300 uses different sorters 1334 and different data limiters 1332, as mentioned above and as further described below. For instance, the data limiter for one location data client 1310 might limit the list of predicted locations for that client to N predicted locations, while the data limiter for another location data client 1310 might limit the list of predicted locations for that client to M predicted locations, where N and M are two different integers. Similarly, the sorting criteria for the sorter 1334 for one location data client 1310 might specify that the "Find My Car" predicted location appear in the list of predicted locations if it is in the top N (e.g., top 10) predicted locations. On the other hand, the sorting criteria for the sorter 1334 for another location data client 1310 might specify that the "Find My Car" predicted location always appear in the list of predicted locations when such a predicted location is available, but that the predicted car location be listed as the last entry of M predicted locations (e.g., as the third predicted location in a list of three predicted locations).

Figure 16:
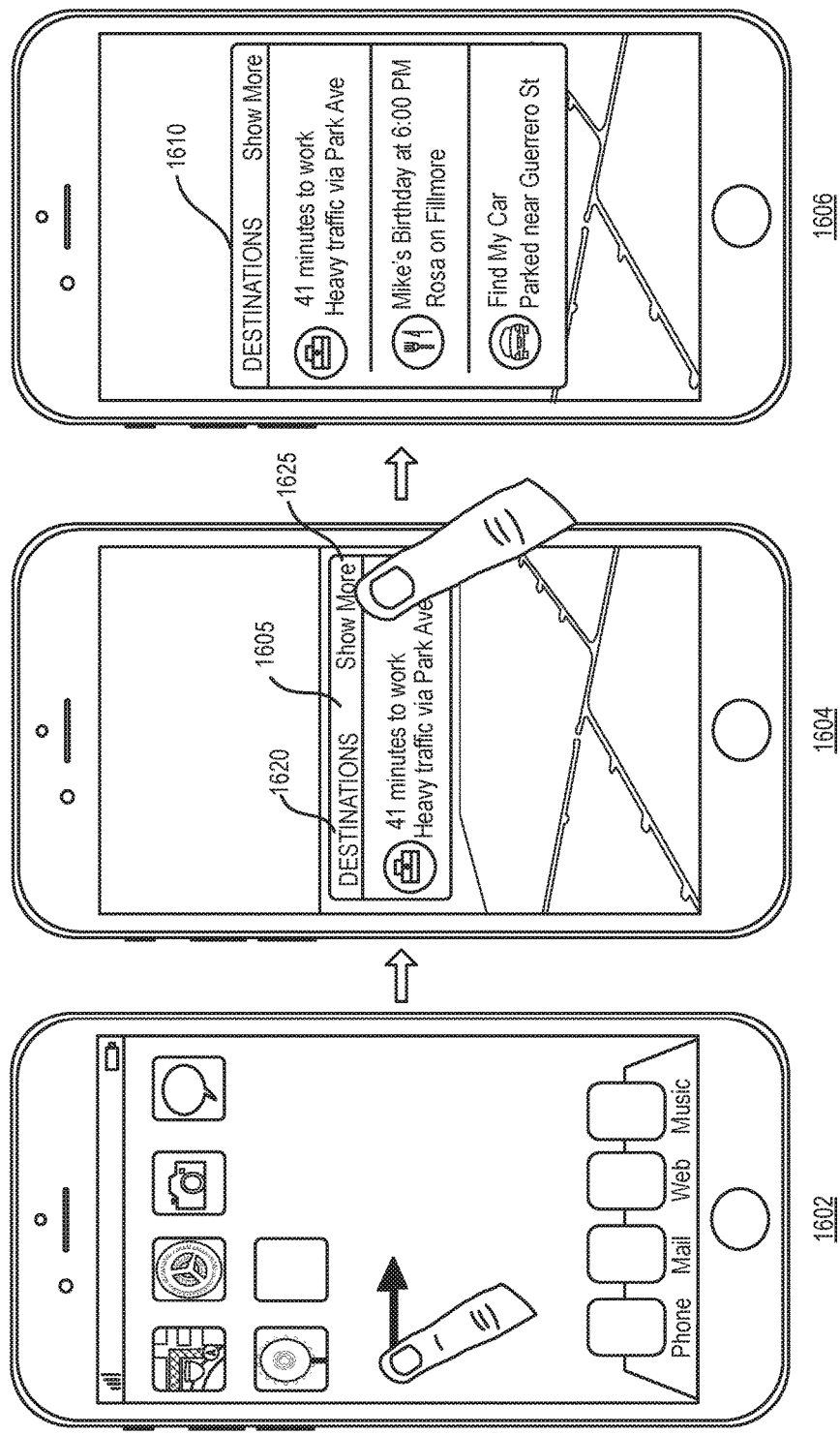
FIG. 16 illustrates an example of notification panes that displays predicted locations generated by the prediction engine of some embodiments of the invention.

Several examples of populating a search card with predicted locations were described above. FIG. 16 illustrates an example of notification panes 1605 and 1610 that displays predicted locations generated by the prediction engine 1300 of some embodiments of the invention. These notification panes can be accessed on the mobile device without opening the map application, which includes the prediction engine 1300 that formulates the predictions. In some embodiments, the notification panes 1605 and 1610 are generated by a notification manager that is part of a notification framework of the device operating system.

In some embodiments, the device OS provides an affordance to view map-related notifications without opening of the map application. As shown in the first stage 1602 of FIG. 16, the affordance in some embodiments is a left swipe on the touch-sensitive display screen of the mobile device when the device is displaying its home page. This swipe directs the operating system to present a page on which one or more notification panes are being displayed. In some embodiments, some or all of these notification panes are associated with applications executing on the mobile device, and present information obtained from these applications. One of these notification panes provides travel data to predicted locations formulated by the map application's prediction engine 1300.

In response to the selection of the affordance, the notification manager of some embodiments directs the map application to generate, for a condensed notification pane, a display that provides travel data to a predicted location that most likely is the next travel destination of the mobile device. In some embodiments, the notification manager simply provides the size and identity of the condensed notification pane, and the map application generates the content for display in this pane. To generate the display for this condensed notification pane, the map application's prediction engine 1300 supplies its current sorted list of predicted locations to its limiter 1332 for the notification manger's condensed notification pane, and this limiter returns this list after discarding all the predicted locations, except the highest ranking prediction.

The map application then generates a predicted location output display based on this single predicted location, and then provides this output display to the notification manager or the device's output display service, so that this display can be presented in the condensed notification pane defined by the notification manager. The second stage 1604 of FIG. 16 illustrates an example of a condensed notification pane 1605. As shown in this stage, the condensed pane in this example just provides travel data to the device's home location. The travel data provides traffic data along the most probable route to the home location, and provides an identifier for this route (e.g., in terms of one road along this route). During the workweek, the device's home or work locations are often the most likely next destination of the device, but this does not have to be the case.

As shown, the condensed notification pane 1605 includes a header 1620 that identifies the map application as the source of the information displayed in this notification pane. This pane 1605 also has a "Show More" control 1625, which when selected, causes the notification manager to display the expanded notification pane 1610 to show several additional predicted locations and travel data for these predicted locations.

When the user selects this control 1625, the notification manager of some embodiments directs the map application to generate, for the expanded notification pane 1610, a display that provides travel data to predicted locations that are most likely the next travel destination of the mobile device. In some embodiments, the notification manager simply provides the size and identity of the expanded notification pane, and the map application generates the content for display in this pane. To generate the display for this expanded notification pane, the map application's prediction engine 1300 supplies its current sorted list of predicted locations to another one of its limiter 1332 for the notification manger (i.e., to a limiter for its expanded notification pane), and this limiter returns this list after discarding all but the M top predicted locations, where M is an integer (e.g., 3).

After receiving the M top predicted locations, the prediction engine 1300 directs its sorter 1334 for the notification manager to re-sort the M top predicted locations according to a set of sort criteria for the notification manager. For instance, the sort criteria might specify that the "Find My Car" entry should be present when such a prediction is available, but this entry should be the last item in the expanded notification pane.

The map application then generates a predicted location output display based on the sorted list of predicted location that it receives from its expanded pane's sorter 1334, and then provides this output display to the notification manager or the device's output display service, so that this display can be presented in the expanded notification pane defined by the notification manager. The third stage 1606 of FIG. 16 illustrates an example of the expanded notification pane 1610. As shown in this stage, the expanded pane provides travel data to the top three predicted locations for the device, which in this example are the home location, the location of a birthday party, and the "Find My Car" locations. The travel data for the home location is the same data that was provided in the condensed pane displayed in the second stage 1604. The travel data for the birthday party is expressed in terms of a restaurant name (Rosa) on a particular street (Fillmore), while the travel data for the car is expressed in terms of the approximate location of the car (Parked near Guerrero St).

Figure 17:
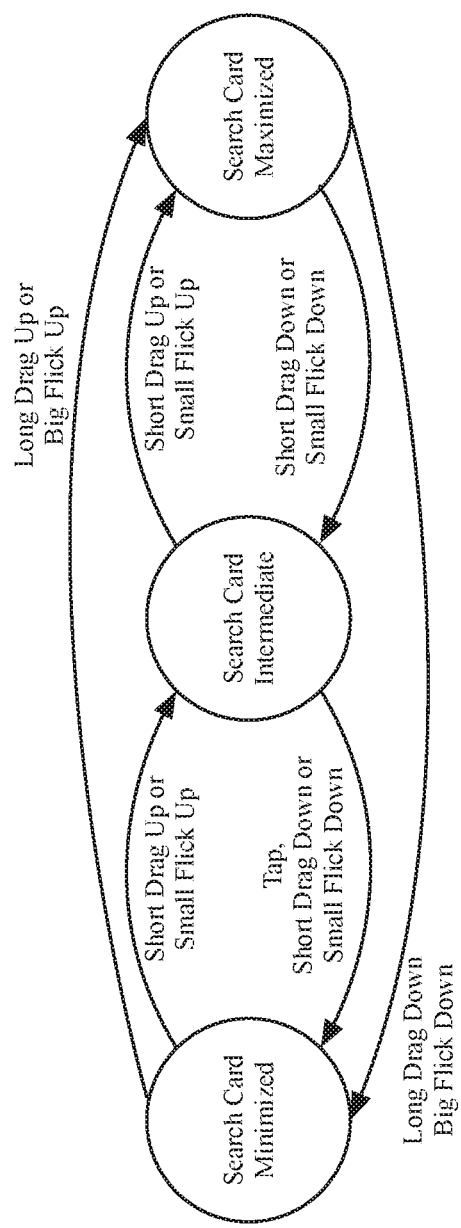
FIG. 17 illustrates a state diagram that shows various display states of search card and transitions between these states for some embodiments of the invention.

FIG. 17 illustrates a state diagram that shows various display states of search card and transitions between these states for some embodiments of the invention. This state diagram is implemented by a view coordinator of the map application that manages the views that are presented in the cards that are stacked on top of the map display area. This view coordinator is further described in concurrently filed U.S. Patent Application Pulication No. 15/274,801 entitled "Map Application with Novel Browsing, Search and Route Planning Tools," that is incorporated herein by reference.

In the example illustrated in FIG. 17, three display states are shown for the search cards, with the three display states being the minimized, intermediate and maximized states. As shown, a small flick up or a short drag up directs the view coordinator to transition the search card from its minimized state to its intermediate state, or from its intermediate state to its maximized state. Similarly, a small flick down or a short drag down directs the view coordinator to transition the search card from its maximized state to its intermediate state, or from its intermediate state to its minimized state. A big flick up or a long drag up directs the view coordinator to transition the search card from its minimized state to its maximized state, while a big flick down or a long drag down directs the view coordinator to transition the card from its maximized state to its minimized state. Also, as shown, a tap operation directs the view coordinator to transition the search card from its intermediate state to its minimized state. In some embodiments, such a tap operation can also be used to direct the view coordinator to transition the search card from its maximized state to its intermediate state, and/or to transition this card from its minimized state to its intermediate state.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
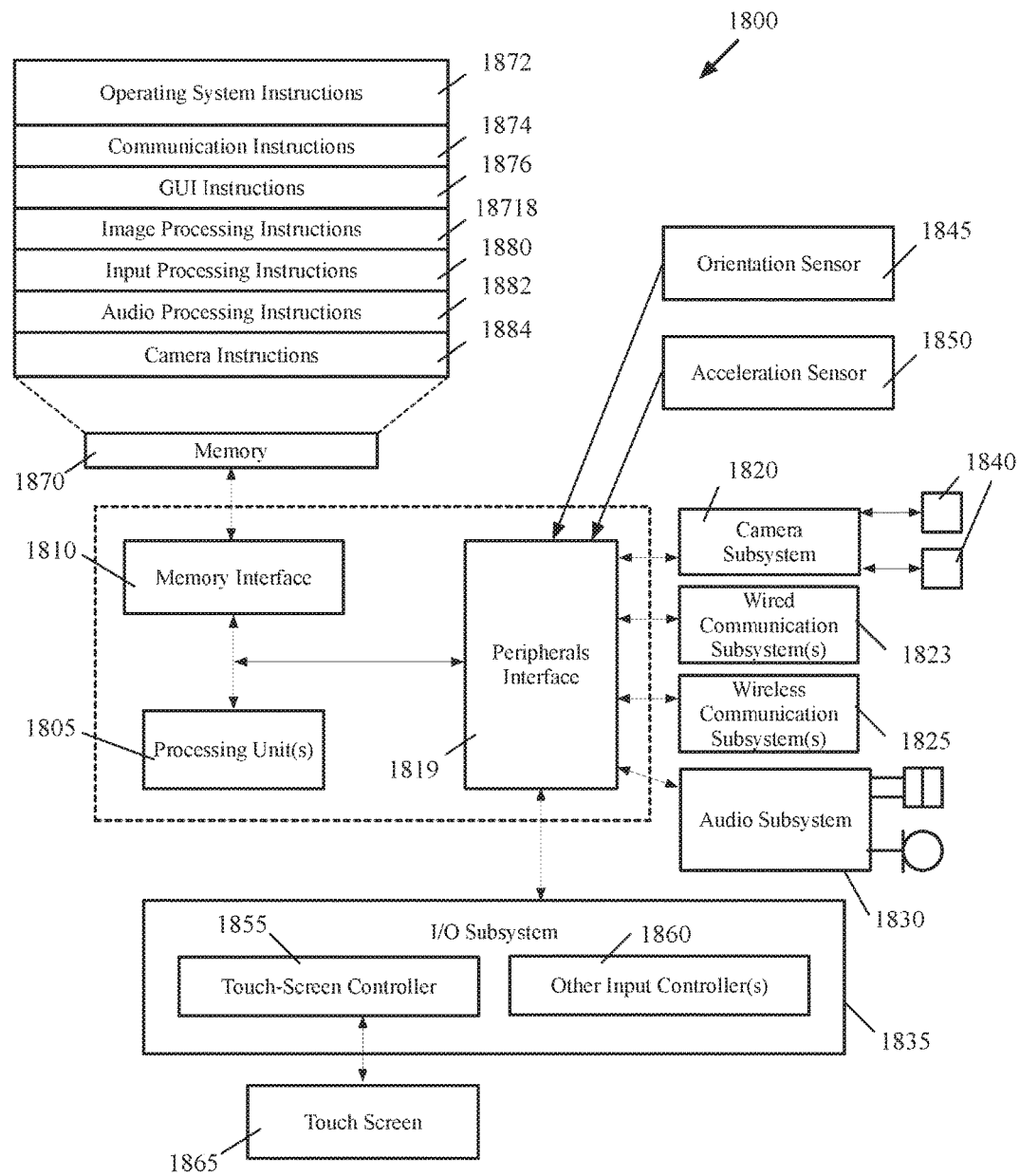
FIG. 18 is an example of an architecture of such a mobile computing device.

The applications of some embodiments operate on mobile devices, such as smart phones (e.g., iPhones®) and tablets (e.g., iPads®). FIG. 18 is an example of an architecture 1800 of such a mobile computing device. Examples of mobile computing devices include smartphones, tablets, laptops, etc. As shown, the mobile computing device 1800 includes one or more processing units 1805, a memory interface 1810 and a peripherals interface 1815.

The peripherals interface 1815 is coupled to various sensors and subsystems, including a camera subsystem 1820, a wireless communication subsystem(s) 1825, an audio subsystem 1830, an I/O subsystem 1835, etc. The peripherals interface 1815 enables communication between the processing units 1805 and various peripherals. For example, an orientation sensor 1845 (e.g., a gyroscope) and an acceleration sensor 1850 (e.g., an accelerometer) is coupled to the peripherals interface 1815 to facilitate orientation and acceleration functions.

The camera subsystem 1820 is coupled to one or more optical sensors 1840 (e.g., a charged coupled device (CCD) optical sensor, a complementary metal-oxide-semiconductor (CMOS) optical sensor, etc.). The camera subsystem 1820 coupled with the optical sensors 1840 facilitates camera functions, such as image and/or video data capturing. The wireless communication subsystem 1825 serves to facilitate communication functions. In some embodiments, the wireless communication subsystem 1825 includes radio frequency receivers and transmitters, and optical receivers and transmitters (not shown in FIG. 18). These receivers and transmitters of some embodiments are implemented to operate over one or more communication networks such as a GSM network, a Wi-Fi network, a Bluetooth network, etc. The audio subsystem 1830 is coupled to a speaker to output audio (e.g., to output voice navigation instructions). Additionally, the audio subsystem 1830 is coupled to a microphone to facilitate voice-enabled functions, such as voice recognition (e.g., for searching), digital recording, etc.

The I/O subsystem 1835 involves the transfer between input/output peripheral devices, such as a display, a touch screen, etc., and the data bus of the processing units 1805 through the peripherals interface 1815. The I/O subsystem 1835 includes a touch-screen controller 1855 and other input controllers 1860 to facilitate the transfer between input/output peripheral devices and the data bus of the processing units 1805. As shown, the touch-screen controller 1855 is coupled to a touch screen 1865. The touch-screen controller 1855 detects contact and movement on the touch screen 1865 using any of multiple touch sensitivity technologies. The other input controllers 1860 are coupled to other input/control devices, such as one or more buttons. Some embodiments include a near-touch sensitive screen and a corresponding controller that can detect near-touch interactions instead of or in addition to touch interactions.

The memory interface 1810 is coupled to memory 1870. In some embodiments, the memory 1870 includes volatile memory (e.g., high-speed random access memory), non-volatile memory (e.g., flash memory), a combination of volatile and non-volatile memory, and/or any other type of memory. As illustrated in FIG. 18, the memory 1870 stores an operating system (OS) 1872. The OS 1872 includes instructions for handling basic system services and for performing hardware dependent tasks.

The memory 1870 also includes communication instructions 1874 to facilitate communicating with one or more additional devices; graphical user interface instructions 1876 to facilitate graphic user interface processing; image processing instructions 1878 to facilitate image-related processing and functions; input processing instructions 1880 to facilitate input-related (e.g., touch input) processes and functions; audio processing instructions 1882 to facilitate audio-related processes and functions; and camera instructions 1884 to facilitate camera-related processes and functions. The instructions described above are merely exemplary and the memory 1870 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 18 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 18 may be split into two or more integrated circuits.

Figure 19:
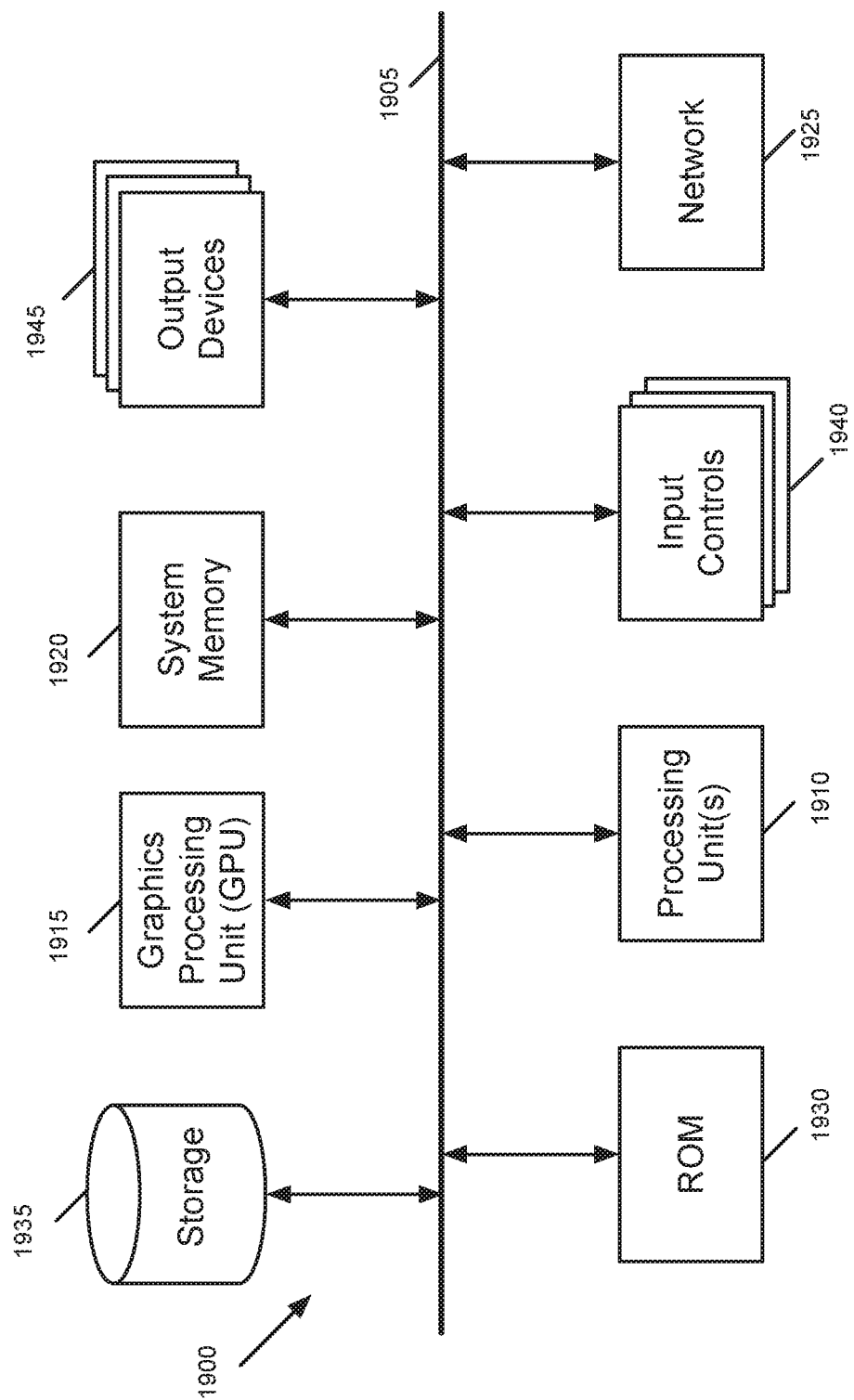
FIG. 19 conceptually illustrates another example of an electronic system with which some embodiments of the invention are implemented.

FIG. 19 conceptually illustrates another example of an electronic system 1900 with which some embodiments of the invention are implemented. The electronic system 1900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the invention. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive, integrated flash memory) as the permanent storage device 1935.

Other embodiments use a removable storage device (such as a floppy disk, flash memory device, etc., and its corresponding drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor needs at runtime. In some embodiments, the invention's processes are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet), or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs) in some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 20:
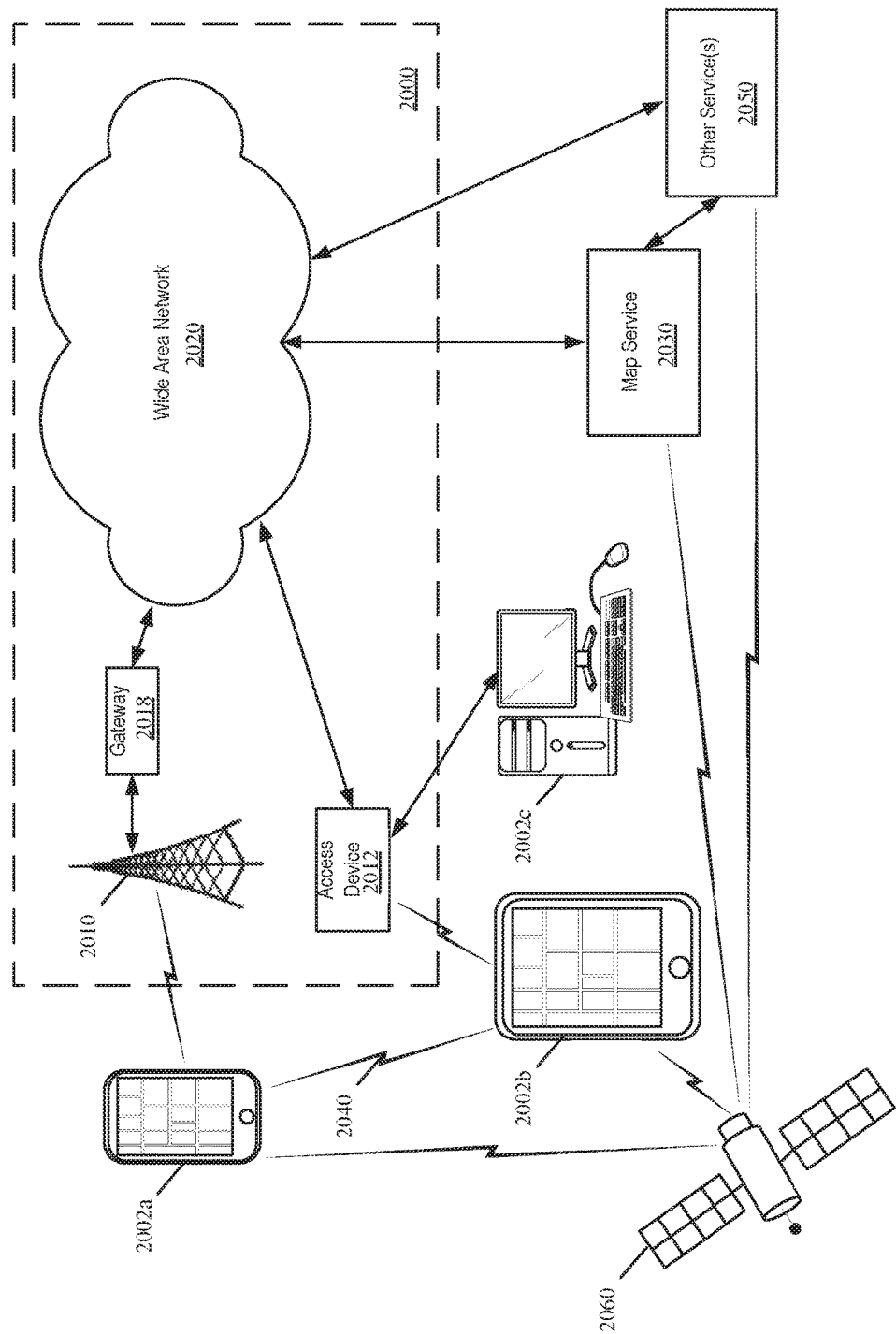
FIG. 20 illustrates one possible embodiment of an operating environment for a map service (also referred to as a mapping service) and client devices.

Various embodiments may operate within a map service operating environment. FIG. 20 illustrates one possible embodiment of an operating environment 2000 for a map service (also referred to as a mapping service) 2030 and client devices 2002*a*-2002*c*. In some embodiments, devices 2002*a*, 2002*b*, and 2002*c* communicate over one or more wired or wireless networks 2010. For example, wireless network 2010, such as a cellular network, can communicate with a wide area network (WAN) 2020, such as the Internet, by use of gateway 2014. A gateway 2014 in some embodiments provides a packet oriented mobile data service, such as General Packet Radio Service (CPRS), or other mobile data service allowing wireless networks to transmit data to other networks, such as wide area network 2020. Likewise, access device 2012 (e.g., IEEE 802.11g wireless access device) provides communication access to WAN 2020.

The client devices 2002*a* and 2002*b* can be any portable electronic or computing device capable of communicating with a map service (e.g., smart phone, tablet, laptop computer, etc.). Device 2002*c* can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2002*a*-2002*c* are not shown as each accessing the map service 2030 via either the wireless network 2010 and gateway 2014 or the access device 2012, one of ordinary skill in the art will recognize that the client devices of some embodiments may access the map service via multiple different wired and/or wireless protocols.

Devices 2002*a*-2002*c* can also establish communications by other means. For example, these devices may communicate with other wireless devices (e.g., other devices 2002*b*, cell phones, etc.) over the wireless network 2010 or through access device 2012. Likewise the devices 2002*a*-2002*c* can establish peer-to-peer communications 2040 (e.g., a personal area network) by use of one or more communication subsystems, such as Bluetooth® communication or similar peer-to-peer protocols.

Devices 2002*a*-2002*c* may also receive Global Positioning Satellite (GPS) signals from GPS satellites 2060. In addition, in some embodiments the map service 2030 and other services 2050 may also receive GPS signals from GPS satellites 2060.

A map service 2030 may provide map services for one or more client devices 2002*a*-2002*c* in communication with the map service 2030 through various communication methods and protocols. A map service 2030 in some embodiments provides map information (e.g., map tiles used by the client devices to generate a two-dimensional or three-dimensional map presentation) and other map-related data, such as two-dimensional map image data (e,g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2002a-2002c may utilize these map services to obtain the various map service data, then implement various techniques to process the data and provide the processed data to various entities (e.g., internal software or hardware modules, display screens of the client devices, external display screens, or other external systems or devices.

The map service 2030 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2002a-2002c, the map service 2030 of some embodiments, performs various optimization techniques to analyze a map tile before encoding the tile.

In some embodiments, the map tiles are generated by the map service 2030 for different possible display resolutions at the client devices 2002a-2002c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 2030 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2030 responds to requests from the client devices 2002a-2002c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2002a-2002c that obtain map service data from the map service 2030 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2002a-2002c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2030. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2002a-2002c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2030 and/or other services) 2050 are configured to process search requests from any of the client devices. Search requests may include but are not limited to queries for businesses, addresses, residential locations, points of interest, or some combination thereof. Map service 2030 and/or other service(s) 2050 may be configured to return results related to a variety of parameters including but not limited to a location entered into an address bar or other text entry field (including abbreviations and/or other shorthand notation), a current map view (e.g., a user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2030 and/or other service(s) 2050 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2030 and/or other service(s) 2050, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2030 and/or other service(s) 2050 provide one or more feedback mechanisms to receive feedback from client devices 2002*a*-2002*c*. For instance, client devices may provide feedback on search results to map service 2030 and/or other service(s) 2050 (e.g., feedback specifying ratings, reviews, temporary or permanent business closures, errors etc.); this feedback may be used to update information about points of interest in order to provide more accurate or more up-to-date search results in the future. In some embodiments, map service 2030 and/or other service(s) 2050 may provide testing information to the client device (e.g., an A/B test) to determine which search results are best. For instance, at random intervals, the client device may receive and present two search results to a user and allow the user to indicate the best result. The client device may report the test results to map service 2030 and/or other service(s) 2050 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, several embodiments were described above in which the map application proactively opens the search card when the map application starts. However, in some embodiments, the map application proactively opens the search card even after it was started before (e.g., proactively opens the search card when it was brought to the foreground after it was minimized or pushed to operating in the background).

Also, several proactive search windows described above include both the search field and the predicted destination list in a contiguous display area that moves up from the bottoms of the display area. Other embodiments, however, display the search field above the map display area, while providing a card for displaying one or more predicted destinations in a list that comes up from the bottom of the map display area. In some of these embodiments, the list of predicted destinations in its minimized state displays the predicted destination with the highest predicted score and displays an affordance for obtaining directions to this predicted destination.

The description above provides several examples of data sources for obtaining sample locations for the prediction engine to analyze to identify a list of predicted destinations. Other than the data sources mentioned above, some embodiments use one or more of the following data sources: electronic wallet, a friend finding application, favorites of third party applications (such as Foursquare, etc.), lodging application (e.g., Airbnb), real estate application (e.g., Redfin), automotive applications (e.g., an application identifying supercharger locations), food delivery application, taxi applications, etc. One of ordinary skill will realize that in different embodiments different sets of data sources are used to obtain the sample location data. Therefore, one of ordinary skill in the art would understand that the invention is not to be limited by the foregoing illustrative details, but rather is to be defined by the appended claims.

The invention claimed is:

1. A method of formulating predicted destinations for a location data client executing on a mobile device, the method comprising:
    collecting a plurality of candidate locations from one or more computer applications executing on the mobile device;
    filtering the plurality of candidate locations to remove at least one undesirable location, wherein the at least one undesirable location includes one of an irrelevant address and an uninteresting address;
    scoring each candidate location in the filtered plurality of candidate locations based on one or more scoring parameters;
    sorting the filtered plurality of candidate locations based on one or more sorting criteria that are specific to the location data client;
    based on the sorting, generating a sorted and filtered predicted destination list; and
    providing the predicted destination list to the location data client.

2. The method of claim 1, wherein the scoring parameters include a location source parameter, a time of collection parameter, and a proximity to current location parameter.

3. The method of claim 1, further comprising:
using a plurality of filters to filter the plurality of candidate locations;
iteratively executing each filter of the plurality of filters; and
stopping the iterative execution when one filter of the plurality of filters returns a decision to remove a candidate location of the plurality of candidate locations.

4. The method of claim 1, wherein scoring each candidate location further comprises:
receiving a confidence score associated with each candidate location from the one or more computer applications;
determining a parameter score for each scoring parameter of the scoring parameters to determine a plurality of parameter scores;
determining a weight parameter for each parameter score based on the confidence score; and
generating a weighted sum of the plurality of parameter scores.

5. The method of claim 4, further comprising:
determining that a metadata value for the metadata parameter for the first candidate location is distinct from a metadata value for the metadata parameter for the second candidate location; and
declining to discard the first candidate location from the plurality of candidate locations.

6. The method of claim 1, further comprising:
determining that a first candidate location is a duplicate of a second candidate location; and
discarding, using a de-duplicator, the first candidate location from the plurality of candidate locations.

7. An electronic device comprising a non-transitory medium for storing a map application for displaying a map, the program comprising sets of instructions for:
collecting a plurality of candidate locations from one or more computer applications executing on the mobile device;
filtering the plurality of candidate locations to remove at least one undesirable location, wherein the at least one undesirable location includes one of an irrelevant address and an uninteresting address;
scoring each candidate location in the filtered plurality of candidate locations based on one or more scoring parameters;
sorting the filtered plurality of candidate locations based on one or more sorting criteria that are specific to the location data client;
based on the sorting, generating a sorted and filtered predicted destination list; and
providing the predicted destination list to the location data client.

8. The electronic device of claim 7, wherein the scoring parameters include a location source parameter, a time of collection parameter, and a proximity to current location parameter.

9. The electronic device of claim 7, further comprising:
using a plurality of filters to filter the plurality of candidate locations;
iteratively executing each filter of the plurality of filters; and
stopping the iterative execution when one filter of the plurality of filters returns a decision to remove a candidate location of the plurality of candidate locations.

10. The electronic device of claim 7, wherein scoring each candidate location further comprises:
receiving a confidence score associated with each candidate location from the one or more computer applications;
determining a parameter score for each scoring parameter of the scoring parameters to determine a plurality of parameter scores;
determining a weight parameter for each parameter score based on the confidence score; and
generating a weighted sum of the plurality of parameter scores.

11. The electronic device of claim 10, further comprising:
determining that a metadata value for the metadata parameter for the first candidate location is distinct from a metadata value for the metadata parameter for the second candidate location; and
declining to discard the first candidate location from the plurality of candidate locations.

12. The electronic device of claim 7, further comprising:
determining that a first candidate location is a duplicate of a second candidate location; and
discarding, using a de-duplicator, the first candidate location from the plurality of candidate locations.

13. A non-transitory machine readable medium storing an application executable by at least one processing unit of a device, the application comprising sets of instructions for:
collecting a plurality of candidate locations from one or more computer applications executing on the mobile device;
filtering the plurality of candidate locations to remove at least one undesirable location, wherein the at least one undesirable location includes one of an irrelevant address and an uninteresting address;
scoring each candidate location in the filtered plurality of candidate locations based on one or more scoring parameters;
sorting the filtered plurality of candidate locations based on one or more sorting criteria that are specific to the location data client;
based on the sorting, generating a sorted and filtered predicted destination list; and
providing the predicted destination list to the location data client.

14. The non-transitory machine readable medium of claim 13, wherein the scoring parameters include a location source parameter, a time of collection parameter, and a proximity to current location parameter.

15. The non-transitory machine readable medium of claim 13, further comprising:
using a plurality of filters to filter the plurality of candidate locations;
iteratively executing each filter of the plurality of filters; and
stopping the iterative execution when one filter of the plurality of filters returns a decision to remove a candidate location of the plurality of candidate locations.

16. The non-transitory machine readable medium of claim 13, further comprising:
receiving a confidence score associated with each candidate location from the one or more computer applications;
determining a parameter score for each scoring parameter of the scoring parameters to determine a plurality of parameter scores;

determining a weight parameter for each parameter score based on the confidence score; and generating a weighted sum of the plurality of parameter scores.

17. The non-transitory machine readable medium of claim 13, further comprising:

determining that a first candidate location is a duplicate of a second candidate location; and discarding, using a de-duplicator, the first candidate location from the plurality of candidate locations.

* * * * *